United States Patent
Gulati et al.

(10) Patent No.: US 12,245,129 B2
(45) Date of Patent: Mar. 4, 2025

(54) IN-VEHICLE MACHINE LEARNING SERVICE DISCOVERY IN PERCEPTIVE WIRELESS COMMUNICATIONS

(71) Applicant: QUALCOMM Incorporated, San Diego, CA (US)

(72) Inventors: Kapil Gulati, Belle Mead, NJ (US); Qing Li, Princeton Junction, NJ (US); Kyle Chi Guan, New York, NY (US); Himaja Kesavareddigari, Bridgewater, NJ (US); Hong Cheng, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 511 days.

(21) Appl. No.: 17/652,673

(22) Filed: Feb. 25, 2022

(65) Prior Publication Data
US 2023/0276338 A1    Aug. 31, 2023

(51) Int. Cl.
*H04W 40/12* (2009.01)
*H04W 4/20* (2018.01)
*H04W 76/10* (2018.01)

(52) U.S. Cl.
CPC ............. *H04W 40/12* (2013.01); *H04W 4/20* (2013.01); *H04W 76/10* (2018.02)

(58) Field of Classification Search
CPC ........ H04W 40/12; H04W 76/10; H04W 4/20
USPC ....................................................... 455/63.4
See application file for complete search history.

(56) References Cited

U.S. PATENT DOCUMENTS

| 2012/0157123 A1* | 6/2012 | Li | H04W 4/023 |
| | | | 455/456.2 |
| 2013/0297811 A1* | 11/2013 | Park | H04W 4/20 |
| | | | 709/228 |
| 2014/0273943 A1* | 9/2014 | Wu | H04L 12/1485 |
| | | | 455/406 |

(Continued)

FOREIGN PATENT DOCUMENTS

| EP | 4087343 A1 | 11/2022 |
| WO | 2019133353 A1 | 7/2019 |

(Continued)

OTHER PUBLICATIONS

International Search Report and Written Opinion—PCT/US2023/011557—ISA/EPO—May 15, 2023.

*Primary Examiner* — April G Gonzales

(74) *Attorney, Agent, or Firm* — Procopio, Cory, Hargreaves & Savitch LLP

(57) ABSTRACT

A first UE and a second UE may exchange information relating to one or more machine learning data services. The one or more machine learning data services may be provided by the second UE. The first UE and the second UE may pair with each other for the one or more machine learning data services. The second UE may perform machine learning inference using at least one machine learning inference model, and may transmit the inference result (e.g., a link quality prediction) associated with a link between a network node and the first UE to the network node. The network node may switch (the direction of) the network node beam if the inference result predicts that the degree of link quality degradation associated with a current network node beam is going to be greater than a prespecified threshold.

30 Claims, 19 Drawing Sheets

(56) References Cited

U.S. PATENT DOCUMENTS

| | | | | |
|---|---|---|---|---|
| 2015/0296552 A1* | 10/2015 | Huang | ............... | H04W 8/005 |
| | | | | 370/252 |
| 2018/0035278 A1* | 2/2018 | Aminaka | ............ | H04W 76/14 |
| 2019/0215879 A1* | 7/2019 | Song | ................... | G10L 15/22 |
| 2019/0327601 A1* | 10/2019 | Kwon | ............. | H04W 28/0215 |
| 2020/0245394 A1* | 7/2020 | Wu | ..................... | H04W 76/11 |
| 2020/0382616 A1* | 12/2020 | Vaishampayan | ........ | H04L 67/59 |
| 2022/0400362 A1* | 12/2022 | Ahmad | ................ | H04W 12/08 |
| 2023/0121104 A1* | 4/2023 | Wu | ..................... | G01S 19/51 |
| | | | | 455/456.6 |
| 2023/0137283 A1* | 5/2023 | Yan | ..................... | H04W 48/18 |
| | | | | 455/418 |
| 2023/0328492 A1* | 10/2023 | Guan | ................ | H04B 7/0695 |
| | | | | 455/434 |
| 2024/0107594 A1* | 3/2024 | Guan | ................ | H04W 76/10 |

FOREIGN PATENT DOCUMENTS

| | | | |
|---|---|---|---|
| WO | 2020092742 A1 | 5/2020 | |
| WO | 2021142609 A1 | 7/2021 | |

* cited by examiner

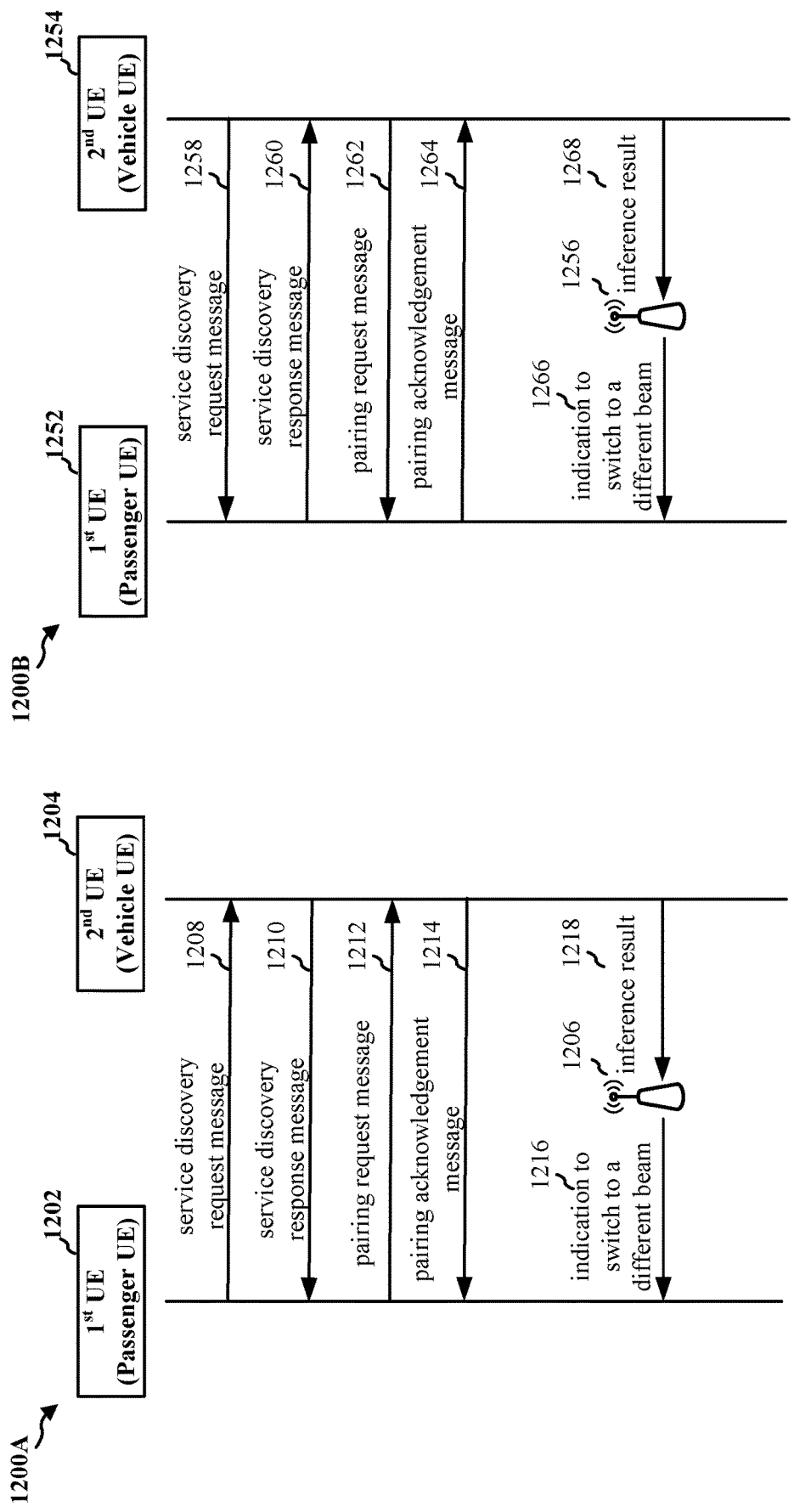

IN-VEHICLE MACHINE LEARNING SERVICE DISCOVERY IN PERCEPTIVE WIRELESS COMMUNICATIONS

TECHNICAL FIELD

The present disclosure relates generally to communication systems, and more particularly, to wireless communication involving machine learning.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a first user equipment (UE). The apparatus may exchange information relating to one or more machine learning data services with a second UE. The one or more machine learning data services may be provided by the second UE. The apparatus may pair with the second UE for the one or more machine learning data services.

In an aspect of the disclosure, a method, a computer-readable medium, and an apparatus are provided. The apparatus may be a second UE. The apparatus may exchange information relating to one or more machine learning data services with a first UE. The one or more machine learning data services may be provided by the second UE. The apparatus may pair with the first UE for the one or more machine learning data services.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 12A and 12B are diagrams of communication flows of methods of wireless communication.

DETAILED DESCRIPTION

Figure 1:
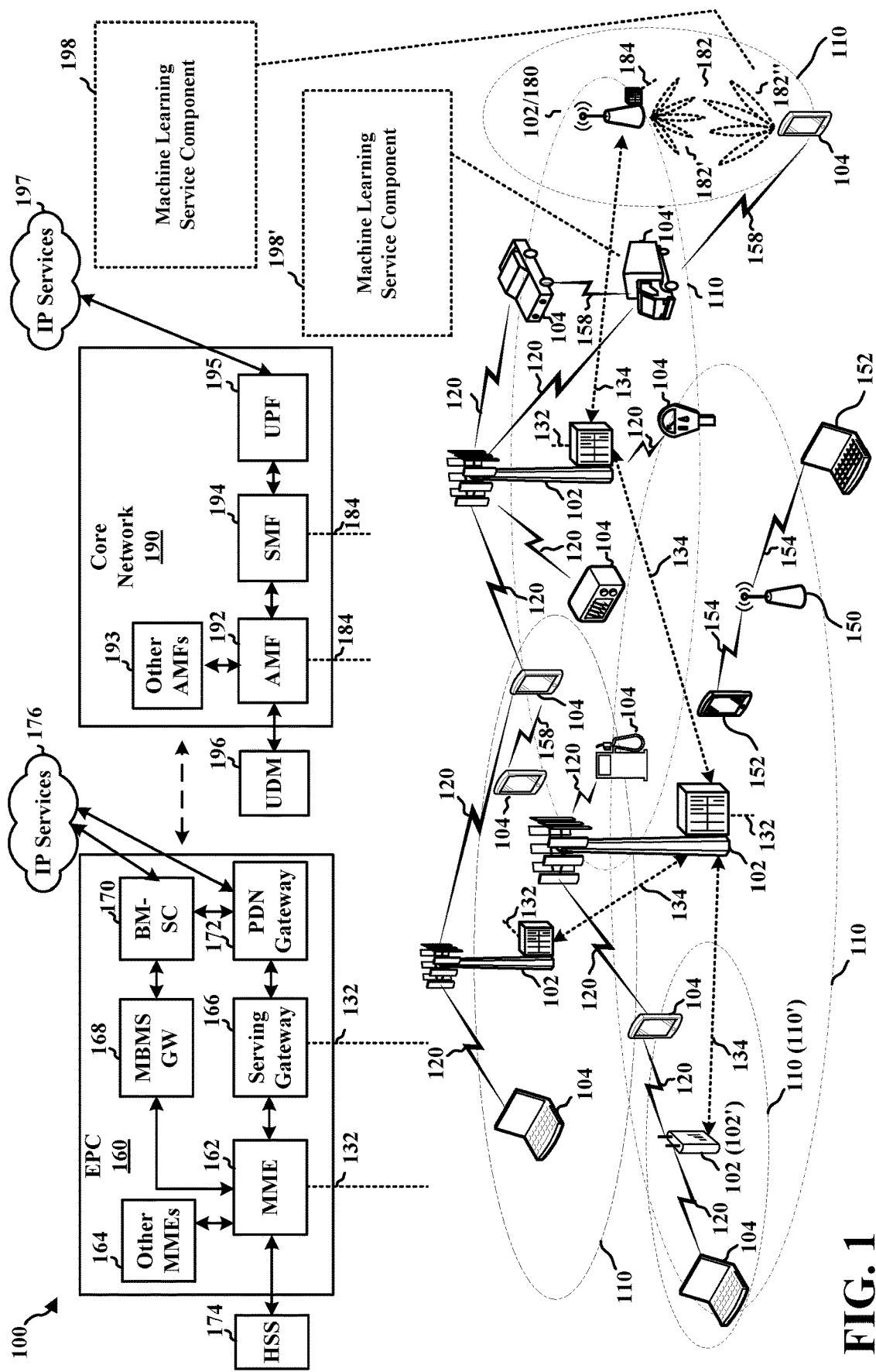
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure.

One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a machine learning data service component 198 that may be configured to exchange information relating to one or more machine learning data services with a second UE. The one or more machine learning data services may be provided by the second UE. The machine learning data service component 198 may be configured to discover and pair with the second UE for the one or more machine learning data services. In certain aspects, the UE 104' may include a machine learning data service component 198' that may be configured to exchange information relating to one or more machine learning data services with a first UE. The one or more machine learning data services may be provided by the second UE. The machine learning data service component 198' may be configured to discover and pair with the first UE for the one or more machine learning data services. Although the following description may be focused on 5G NR, the concepts described herein may be applicable to other similar areas, such as LTE, LTE-A, CDMA, GSM, and other wireless technologies.

Figure 2:
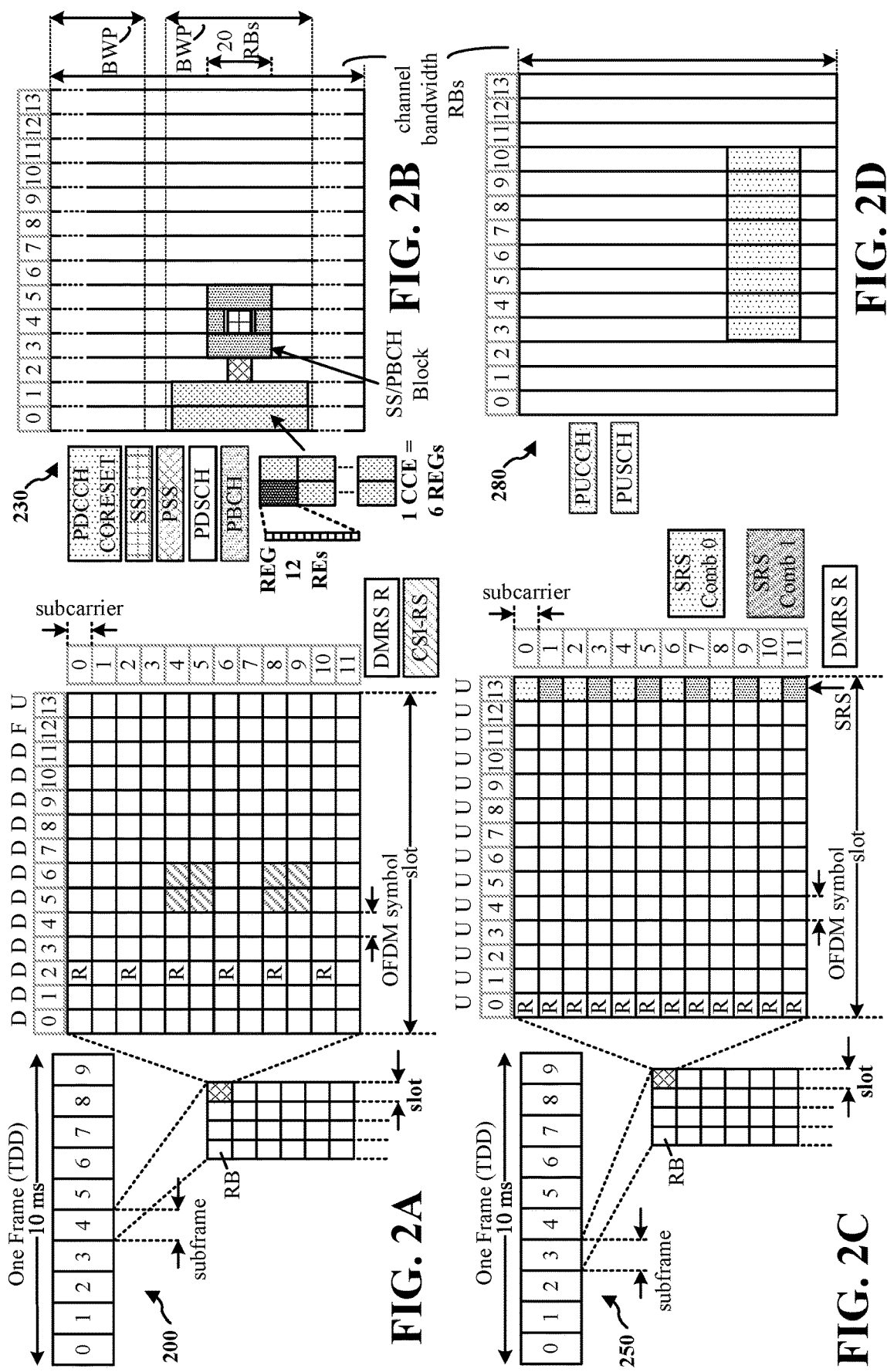
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15[kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology 1.1=2 with 4 slots per subframe. The slot duration is 0.25 ms, the subcarrier spacing is 60 kHz, and the symbol duration is approximately 16.67 $\mu$s. Within a subframe, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
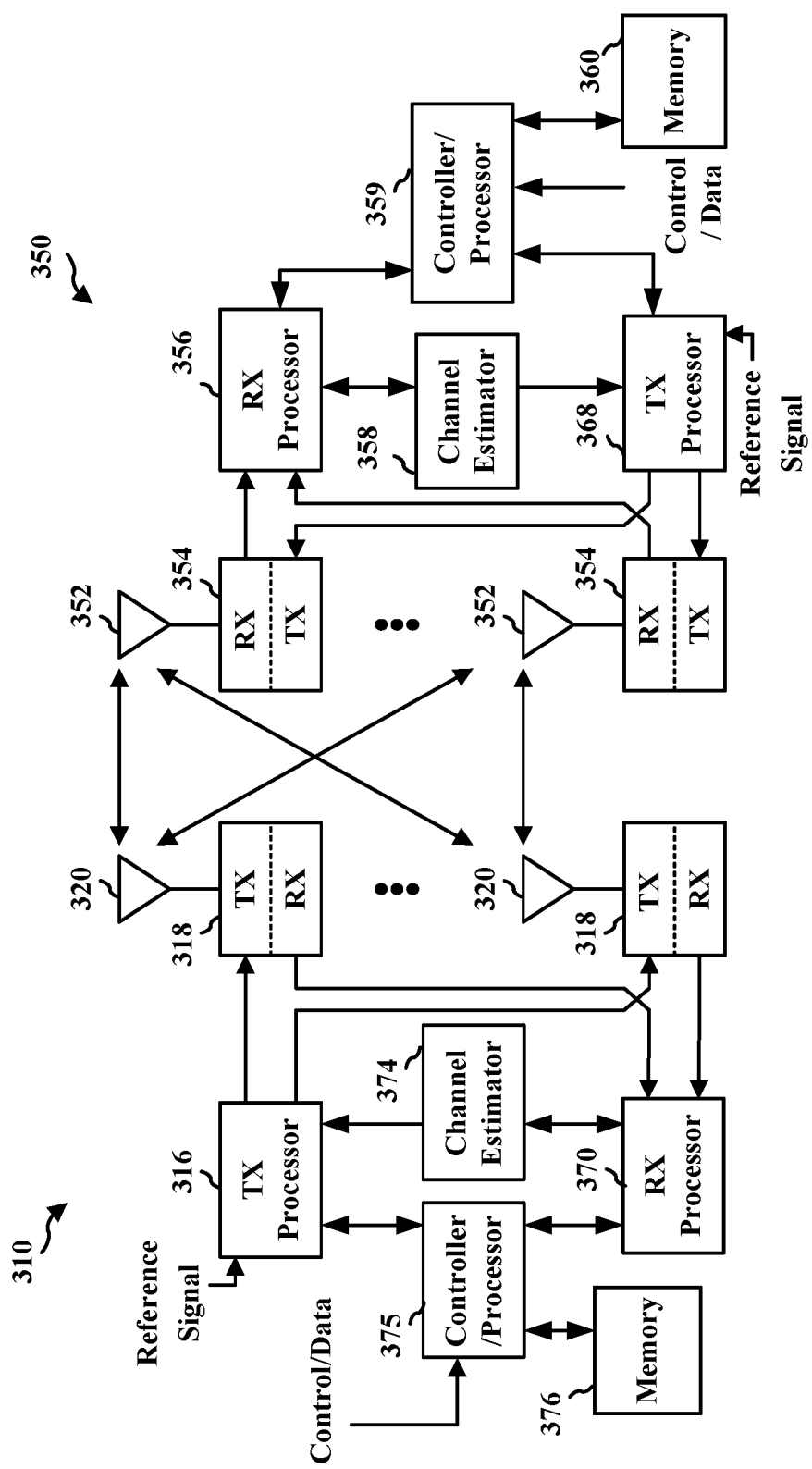
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

Wireless networks may operate at higher frequency bands, such as within millimeter wave (mmW) bands (e.g., FR2 above 28 GHz, FR4 above 60 GHz, or THz band above 100 GHz, etc.), to offer potentially data rates of several tens or hundreds of Gbit/s. For example, wireless devices, such as a network node or UEs, may communicate with each other using beamforming techniques to increase communication speed and reliability. The beamforming techniques may enable a wireless device to transmit a signal towards a particular direction instead of transmitting an omnidirectional signal in all directions. For example, the width of a beam may be inversely correlated to the frequency, where the beam width may decrease as the transmitting frequency increases because more radiating elements may be placed per given area at a transmitter due to the smaller wavelength. In some examples, the transmission path of a narrower beam may be more likely to be tailored to a receiver, such that the transmission may be more likely to meet a line-of-sight (LOS) condition.

Herein a network node can be implemented as an aggregated base station, as a disaggregated base station, an integrated access and backhaul (IAB) node, a relay node, a sidelink node, etc. A network entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC.

While higher frequency bands may provide narrower beam structures and higher transmission rates, higher frequency bands may also encounter higher attenuation and diffraction losses, where a blockage of an LOS path may degrade a wireless link quality, sometimes significantly. For example, when two wireless devices are communicating with each other based on an LOS path at a higher frequency band and the LOS path is blocked by an obstacle, such as pedestrians, buildings, vehicles, etc., the received power may drop significantly. As such, wireless communications based on higher frequency bands may be more susceptible to environmental changes compared to lower frequency bands.

Aspects presented herein may improve the performance and reliability of wireless communications operating at higher frequency bands, such as mmW bands. Aspects presented herein may enable wireless communications to be adaptive to a dynamic environment, where wireless devices may manage wireless communications, such as performing beam managements, based at least in part on environmental conditions. For example, in one aspect of the present disclosure, to overcome rapid variations of the link quality of wireless communication systems operating at higher frequency bands caused by an LOS path blockage, sensing information provided by a vehicle's onboard sensor(s) (e.g., camera(s), radar(s), and/or light detection and ranging (lidar) sensors) may be leveraged to provide information associated with communication environments as well as obstacles (e.g., moving objects) that may potentially block the LOS path and degrade the communication quality for a wireless device, such as a UE. The vehicle may include motor vehicles (e.g., motorcycles, cars, trucks, and buses), railed vehicles (trains and trams, etc.), watercrafts (ships and boats), and/or aircraft (e.g., airplanes, helicopters, and aerostat), etc. In addition, in another aspect of the present disclosure, a vehicle may be configured to employ onboard computation resources and machine learning (ML) models to pre-process collected sensor data and feed inference data to an inference host collocated/associated with a network node (e.g., a base station) for predicting/estimating possible blockages (e.g., LOS path blockages) or best beam pairs so that the network node may proactively initiate beam management or hand-off procedures for a UE. For purposes of the present disclosure, an "inference" or an "ML inference" may refer to a process of running data points into an ML inference model (e.g., an inference host) to calculate an output such as one or more numerical scores, e.g., to use a trained ML algorithm to make one or more predictions. An "inference host" or an "ML inference host" may refer to a network function which hosts the ML inference model during an inference mode.

Figure 4:
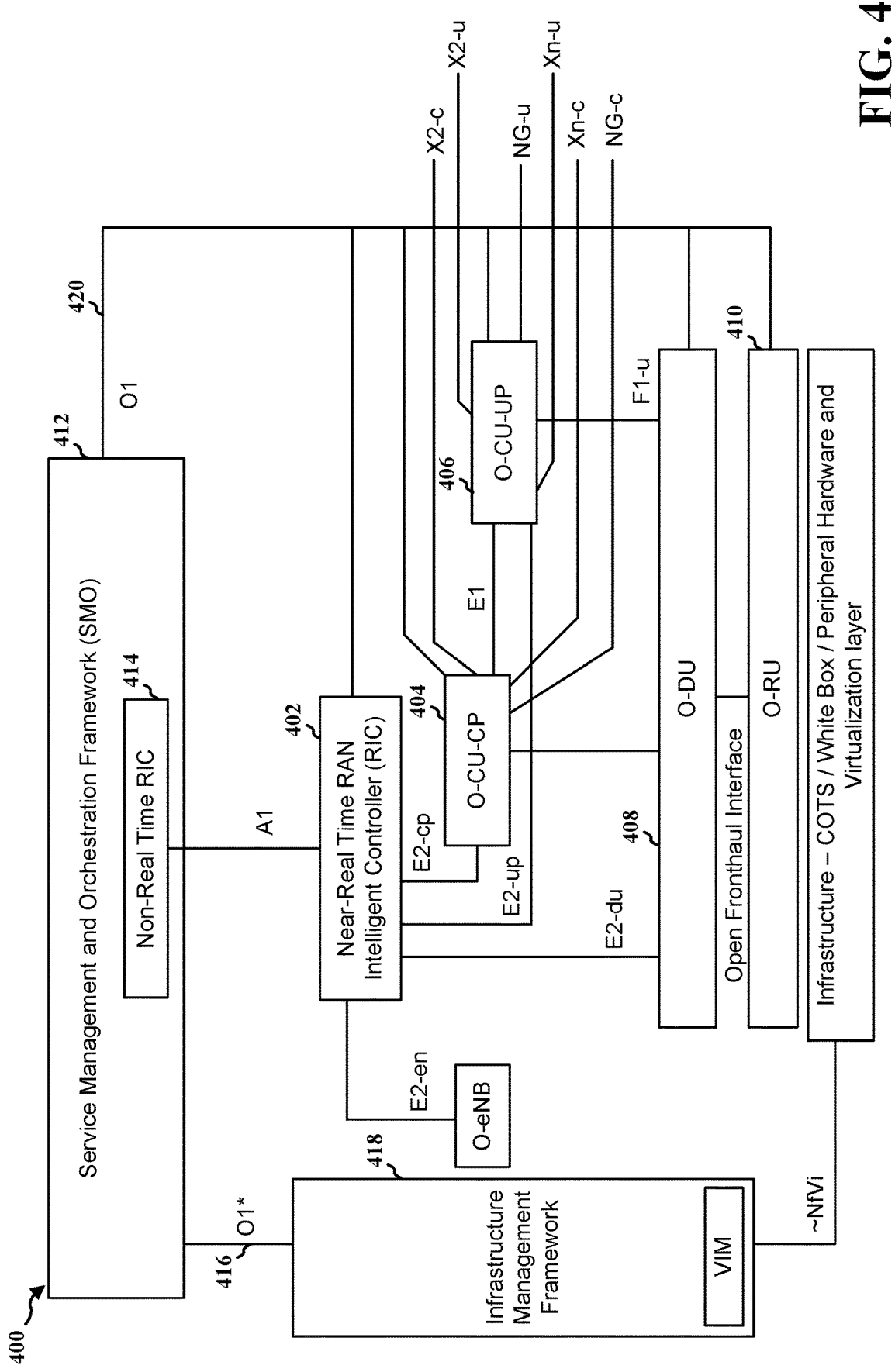
FIG. 4 is a diagram illustrating an example of an open radio access network (O-RAN) architecture implemented with a RAN intelligence controller (RIC) which may be used as an inference host in accordance with various aspects of the present disclosure.

FIG. 4 is a diagram 400 illustrating an example of an open radio access network (O-RAN) architecture implemented with a RIC which may be used as an inference host in accordance with various aspects of the present disclosure. The O-RAN shown in the diagram 400 may also be disaggregated into multiple components/elements. For example, the radio side of an O-RAN architecture (e.g., the components for performing wireless communication) may include a near-RT RIC 402, an O-RAN-CU-control plane (O-CU-CP) 404, an O-RAN-CU-user plane (O-CU-UP) 406, an O-RAN or open DU (O-DU) 408, and an O-RAN or open RU (0-RU) 410. The management side of the O-RAN architecture (e.g., the components for performing communication managements) may include a service management and orchestration framework 412 that contains a non-RT-RIC 414 function.

In some examples, the near-RT RIC 402 may be a logical function that enables near-RT control and optimization of O-RAN elements and resources via fine-grained data collection and actions over an E2 interface. The near-RT RIC 402 may be collocated with the RAN/network node (e.g., the O-CU-CP 404) to provide the RT processing. The non-RT RIC 414 may be a logical function that enables non-RT control and optimization of RAN elements and resources, artificial intelligence (AI)/ML workflow including model training and updates, and policy-based guidance of applications/features in near-RT RIC. The non-RT RIC 414 may be located further from the RAN/network node, such as on a cloud-based server or on an edge server. The O-CU-CP 404 and the O-CU-UP 406 (collectively as "O-CU") may be a logical node hosting RRC, SDAP and PDCP protocols. For example, the O-CU-CP 404 may be a logical node hosting the RRC and the CP part of the PDCP protocol, whereas the O-CU-UP 406 may be a logical node hosting the UP part of the PDCP protocol and the SDAP protocol. The O-DU 408 may be a logical node hosting RLC, MAC, and/or high-physical (PHY) layers based on a lower layer functional split. The O-RU 410 may be a logical node hosting low-PHY layer and RF processing based on a lower layer functional split. The O-RAN may include an O1 interface 420 between management entities in the service management and orchestration framework 412 and O-RAN managed elements, for operation and management, by which fault, configuration, accounting, performance and security (FCAPS) management, software management, file management are to be achieved. The O-RAN may also include an O1*interface 416 between the service management and orchestration framework 412 and an infrastructure management framework 418 supporting O-RAN virtual network functions.

In one aspect, the O-RAN may define an overall RIC architecture that consists of four functional software elements: a DU software function, a multi-radio access technology (RAT) CU protocol stack, the near-RT RIC 402 itself, and the orchestration/network management system (NMS) layer with the non-RT RIC 414. The functional software elements may interact with RU hardware to make it run more efficiently and to be optimized real-time as a part of the RAN cluster to deliver a better network experience to end users.

In some examples, the functionality of the non-RT RIC 414 may include configuration management, device management, fault management, performance management, and lifecycle management for all network elements in the network. The non-RT RIC 414 may use data analytics and AI/ML training/inference to determine the RAN optimization actions for which it may leverage services of the service management and orchestration framework 412 such as data collection and provisioning services of the O-RAN nodes. On the other hand, the near-RT RIC 402 may use embedded intelligence for per-UE controlled load-balancing, RB management, interference detection, and mitigation, etc. This may also provide QoS management, connectivity management, and/or seamless handover control, etc. The near-RT RIC 402 may leverage the near RT state of the underlying network and feed RAN data to train the AI/ML inference models, which may then feed to the near-RT RIC 402 to facilitate radio resource management for subscribers.

Figure 5:
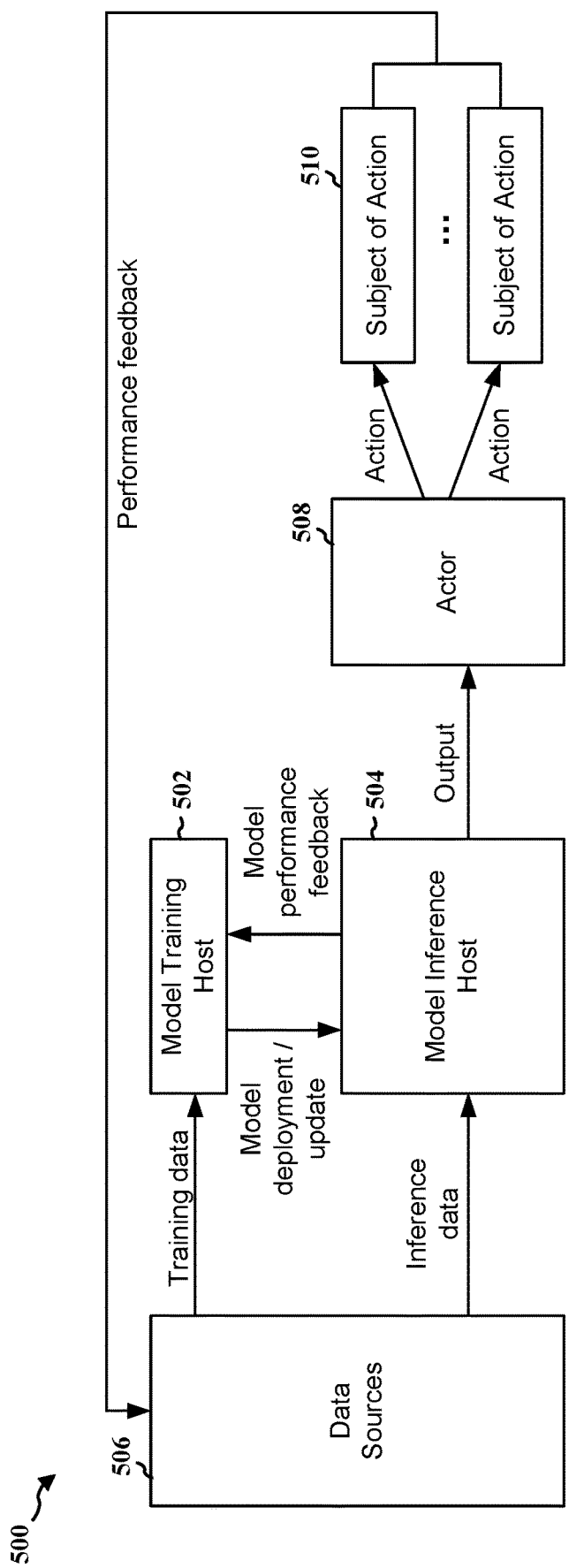
FIG. 5 is a diagram illustrating an example architecture of a functional framework for RAN intelligence enabled by data collection in accordance with various aspects of the present disclosure.

FIG. 5 is a diagram 500 illustrating an example architecture of a functional framework for RAN intelligence enabled by data collection in accordance with various aspects of the present disclosure. In some scenarios, the functional framework for RAN intelligence may be enabled by further enhancement of data collection through use cases and/or examples. For example, principles/algorithms for RAN intelligence enabled by AI and the associated functional framework (e.g., the AI functionality and/or the input/output of the component for AI enabled optimization) have been utilized or studied to identify the benefits of AI enabled RAN (e.g., network node, NG-RAN, etc.) through possible use cases, e.g., energy saving, load balancing, mobility management, coverage optimization, etc. In one example, as shown by the diagram 500, a functional framework for RAN intelligence may include multiple logical entities, such as a model training host 502, a model inference host 504, data sources 506, and/or an actor 508, etc.

The model inference host 504 may be configured to run an ML/AI model based on inference data provided by the data sources 506, and the model inference host 504 may produce an output (e.g., a prediction) for the inference data to the actor 508. The actor 508 may be an element or an entity of a core network or a RAN. For example, the actor 508 may be a network node (e.g., a base station, a gNB, etc.), a CU/DU/RU of a network node, etc. In addition, the actor 508 may also depend on the type of tasks performed by the model inference host 504, type of inference data provided to the model inference host 504, and/or type of output produced by the model inference host 504, etc. For example, if the output from the model inference host 504 is associated with beam management, the actor 508 may be a DU/RU of a network node; whereas if the output from the model inference host 504 is associated with TX/RX scheduling, the actor 508 may be a CU/DU of a network node, etc.

After the actor 508 receives an output from the model inference host 504, the actor 508 may determine whether to act based on the output. For example, if the actor 508 is a network node and the output from the model inference host 504 is associated with beam management, the actor 508 (e.g., the network node) may determine whether to change/modify a TX/RX beam based on the output. If the actor 508 determines to act based on the output, the actor 508 may transmit the action to at least one subject of action 510. For example, if the actor 508 (e.g., the network node) determines to change/modify a TX/RX beam for a communication between the actor 508 and the subject of action 510 (e.g., a UE), the actor 508 may transmit a beam configuration to the subject of action 510. Then, the actor 508 may modify its TX/RX beam based on the beam configuration, such as switching to a new TX/RX beam or applying different parameters for a TX/RX beam, etc.

The data sources 506 may also be configured for collecting data that is used for training an ML inference model. For example, the data sources 506 may collect data from one or more core network and/or RAN entities, which may include the subject of action 510, and provide the collected data to the model training host 502 for ML inference model training. For example, after a subject of action 510 (e.g., a UE) receives a beam configuration from the actor 508 (e.g., a network node), the subject of action 510 may provide performance feedback associated with the beam configuration to the data sources 506, where the performance feedback may be used by the model training host 502 for monitoring or evaluating the ML inference model performance, e.g., whether the output (e.g., prediction) provided by the actor 508 is accurate. In some examples, if the output provided by the actor 508 is inaccurate (or the accuracy is below an accuracy threshold), the model training host 502 may determine to modify or retrain the ML inference model used by the model inference host, such as via an ML inference model deployment/update.

Figure 6:
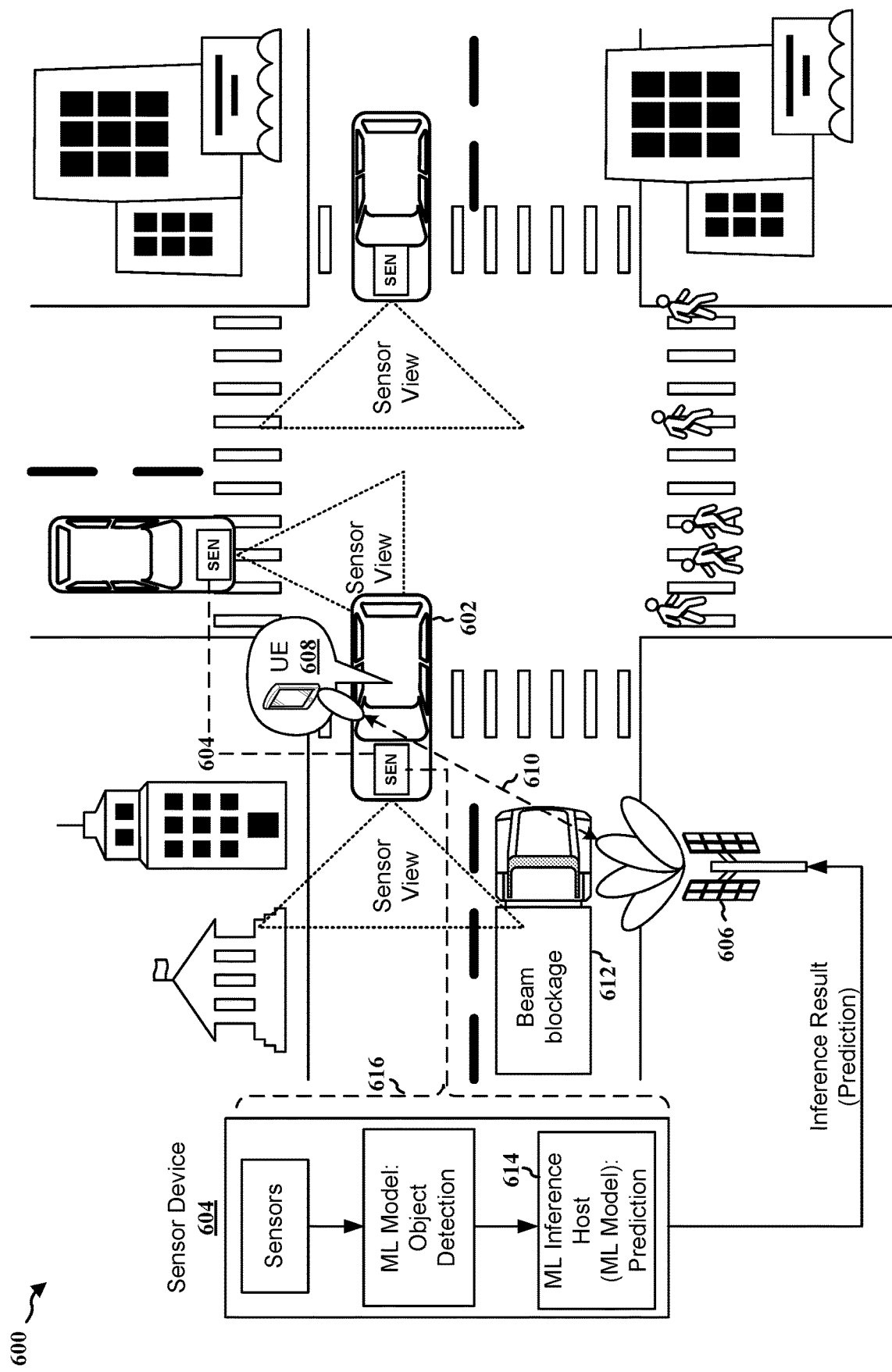
FIG. 6 is a diagram illustrating an example of leveraging data from a sensor of a vehicle to improve wireless communication in accordance with various aspects of the present disclosure.

FIG. 6 is a diagram 600 illustrating an example of leveraging data from a sensor of a vehicle to improve wireless communication in accordance with various aspects of the present disclosure. A vehicle 602 equipped with a sensor device 604 (which may be referred to as a "sensor data collector") may enter into a coverage area of a network node 606, where the coverage area of the network node 606 may include static objects (e.g., buildings) as well as non-static (e.g., moving) objects (e.g., cars, trucks, buses, and pedestrians). The sensor device 604 may be associated with or include one or more sensors, such as cameras, radars, ultra-sound sensors, and/or lidars, etc., which may collectively be referred to as "vehicle-sensors." In addition, the sensor device 604 may be a UE or include UE functions (e.g., a vehicle UE), such that the sensor device 604 may communicate with a network node or a network entity, such as via an RRC connection.

In some scenarios, the radio link quality between the network node 606 and a UE may be impacted by both the static and the non-static objects. For example, a UE 608 in the vehicle 602 (e.g., a wireless device used by a user in the vehicle 602, which may be referred to as an "in-vehicle UE" or "passenger UE") may be communicating with the network node 606 based on an LOS path/link. As shown at 610, at times, the communication (e.g., the LOS path/link) between the UE 608 and the network node 606 may be impacted by both moving and/or stationary objects. For example, a moving truck 612 may block the LOS path/link between the UE 608 and the network node 606, which may degrade the wireless link quality between the UE 608 and the network node 606.

In one aspect of the present disclosure, with sensing information provided by the sensor device 604 (e.g., the sensor data collector) of the vehicle 602, on-board computational resources of the vehicle 602, and/or an ML model used by the vehicle 602 for extracting features, the vehicle 602 may be configured to provide inference data and information of the UE 608 (e.g., location, speed, etc.) to an ML inference host 614 that may be collocated with the on-board computational resources or the feature extraction ML model of the vehicle 602 for enhancing the communication between the UE 608 and the network node 606, such as improving the beam management for the UE 608. For example, as shown at 616, the sensor device 604 may use its sensors to capture images of the views surrounding the vehicle 602, and the captured images may be processed by an ML model that is associated with the sensor device 604 for feature extraction (e.g., for object detection) which may be sent to one of one or more ML inference models associated with the sensor device 604 for ML inference, where the ML inference results (e.g., beam predictions for UE 608) may be sent to the network node 606.

Figure 7:
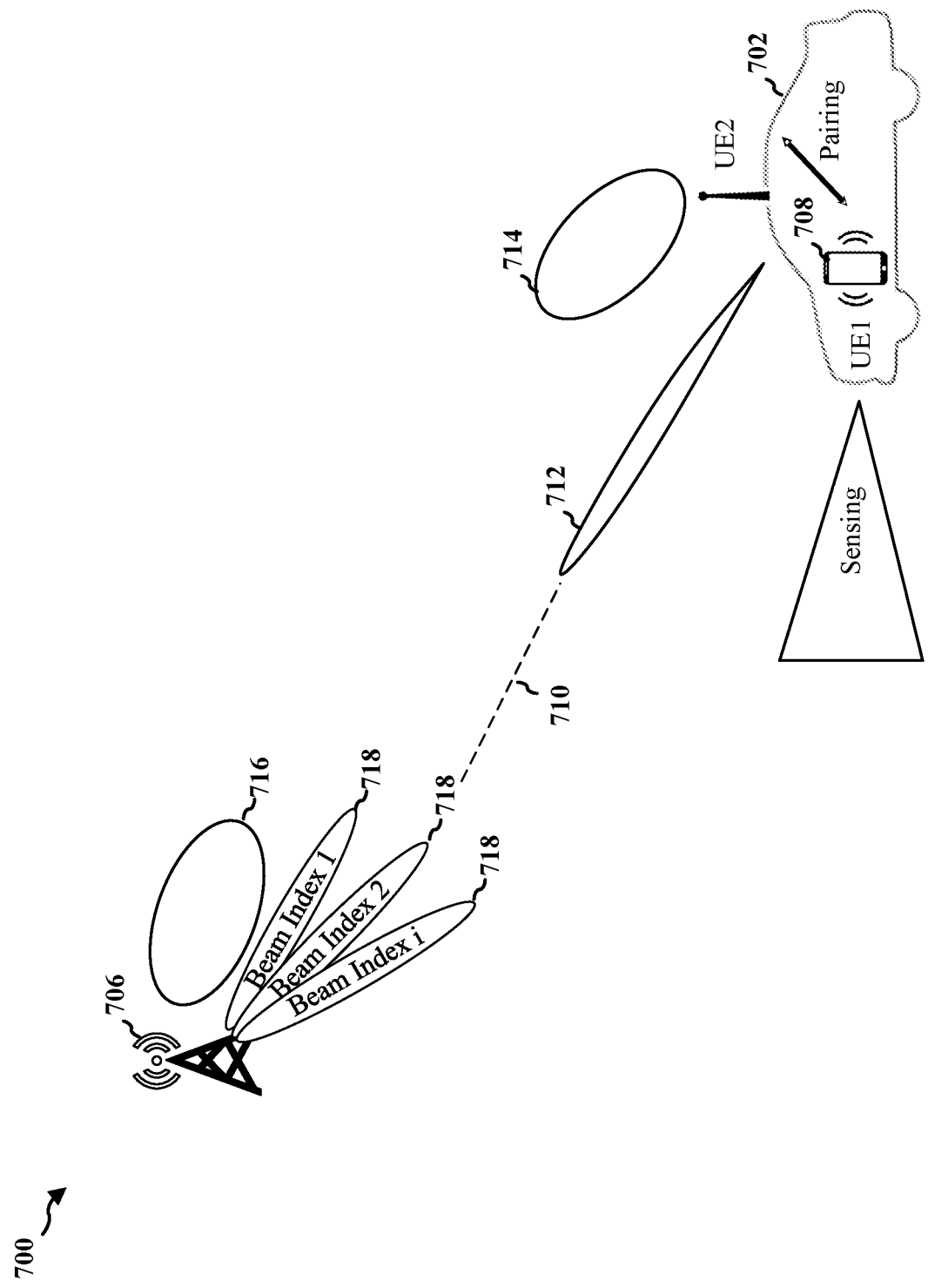
FIG. 7 is a diagram illustrating another example of leveraging data from a sensor of a vehicle to improve wireless communication in accordance with various aspects of the present disclosure.

FIG. 7 is a diagram 700 illustrating an example of leveraging data from one or more sensors of a vehicle to improve wireless communication in accordance with various aspects of the present disclosure. A vehicle 702 (e.g., UE2) equipped with suitable sensors may enter into a coverage area of a network node 706, where the coverage area of the network node 706 may include static objects as well as moving objects. The sensors equipped at the vehicle UE 702 may include one or more such sensors as cameras, radars, ultra-sound sensors, and/or lidars, etc., which may collectively be referred to as "vehicle-sensors." The vehicle 702 including the vehicle-sensors may be a UE or may include UE functions, such that the vehicle 702 may communicate with a network node 706 using the beam 714 paired with one or more network node beams 716 at a lower frequency band (e.g., with a wider beam). Accordingly, the vehicle 702 may be referred to as a vehicle UE 702.

In some scenarios, the radio link quality between the network node 706 and a UE may be impacted by both the static and the moving objects. For example, a passenger UE 708 (e.g., UE1) in (e.g., collocated with) the vehicle UE 702 (e.g., UE2) may be communicating with the network node 706 at a high frequency band (e.g., with a narrow beam) based on an LOS path/link 710 using the beam 712 paired with one of high frequency band network node beams 718 (e.g., with a respective network node beam index of 2). In some examples, the passenger UE 708 may communicate with the network node 706 using a band (e.g., FR2) higher than the band (e.g., FR1) used for the communication between the vehicle UE 702 and the network node 706. Accordingly, in some examples, the beam 712 associated with the passenger UE 708 may be a narrower beam than the beam 714 associated with the vehicle UE 702. At times, the communication (e.g., the LOS path/link) between the passenger UE 708 and the network node 706 may be impacted by moving and/or stationary objects.

In one aspect of the present disclosure, with sensing information provided by the vehicle-sensors of the vehicle UE 702 and on-board computational resources of the vehicle UE 702, an ML model may be used by the vehicle UE 702 for extracting features. The vehicle UE 702 may be configured to provide the inference data and information of the passenger UE 708 (e.g., location, speed, etc.) to an ML inference host that may be collocated or associated with the vehicle UE 702 for enhancing the communication between the passenger UE 708 and the network node 706, such as improving the beam management for the passenger UE 708. To utilize the vehicle UE 702 to enhance the communication between the passenger UE 708 and the network node 706, a discovery and pairing process may be performed between the vehicle UE 702 and the passenger UE 708, where once the two UEs 702 and 708 are paired based on the pairing process, the vehicle UE 702 may operate as a machine learning service provider, and the passenger UE 708 may operate as a machine learning service end user. The pairing process between the vehicle UE 702 and the passenger UE 708 may be described in further detail below in relation to FIGS. 12A, 12B, 13A, and 13B.

Figure 8B:
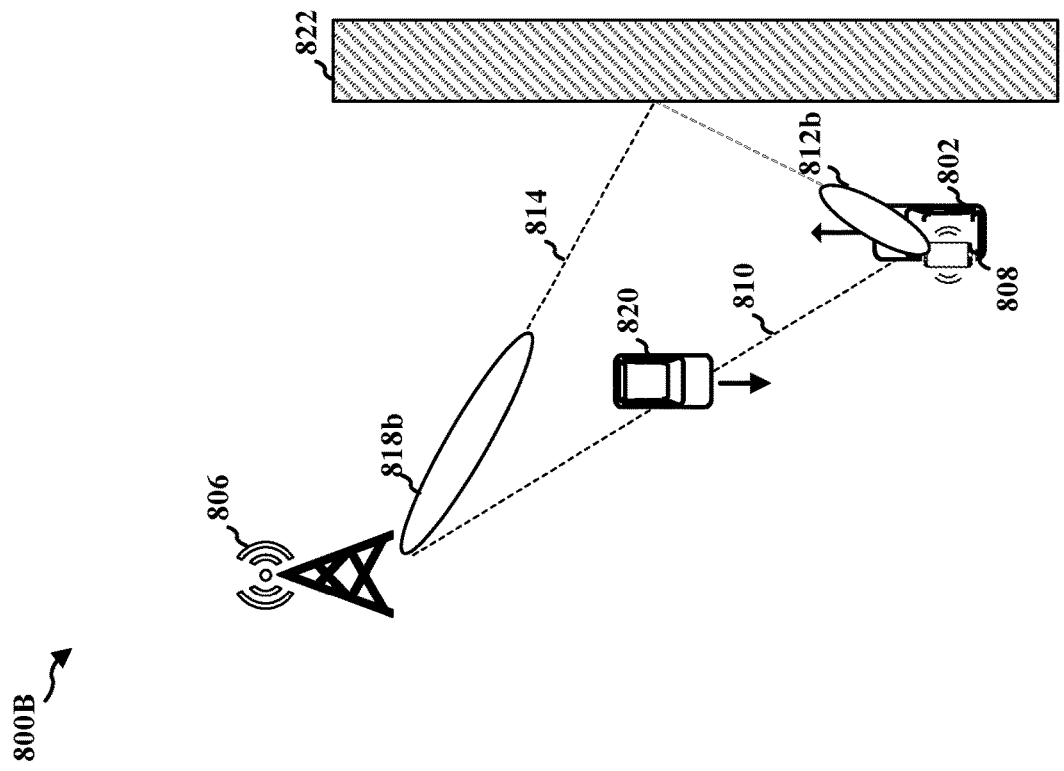
FIGS. 8A and 8B are diagrams illustrating additional examples of leveraging data from a sensor of a vehicle to improve wireless communication in accordance with various aspects of the present disclosure.
Figure 8A:
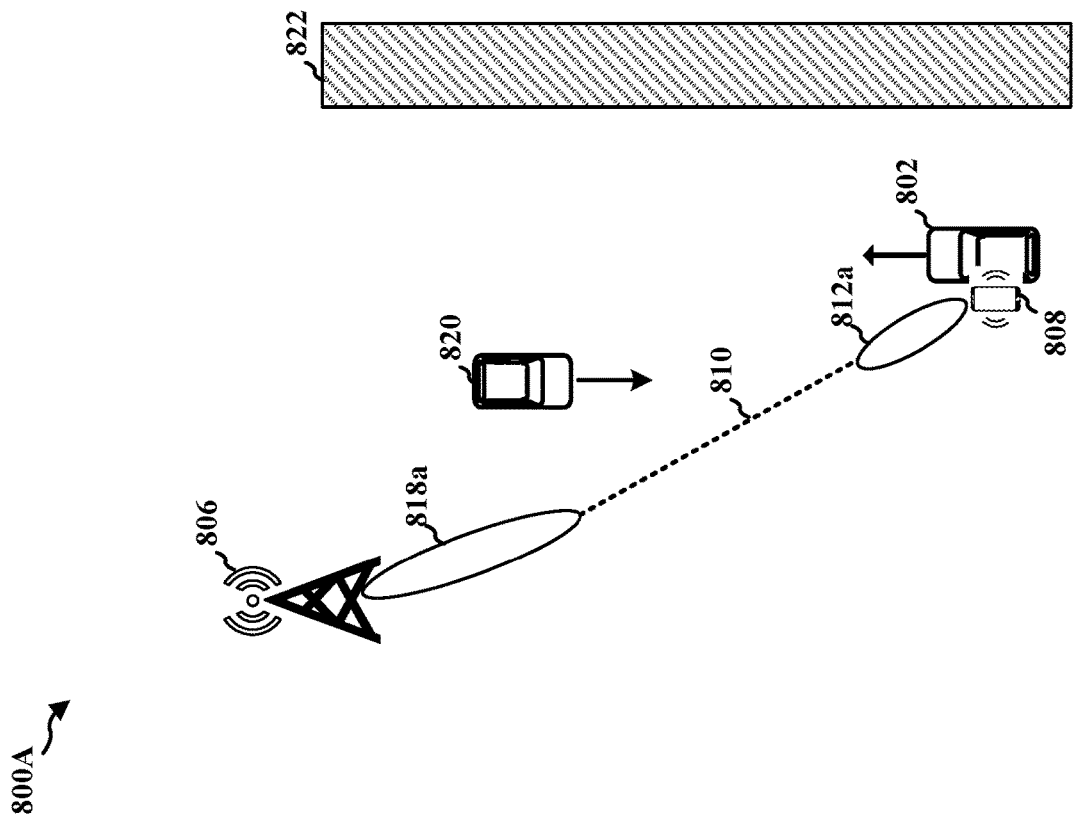

FIGS. 8A and 8B are diagrams 800A and 800B illustrating additional examples of leveraging data from one or more sensors of a vehicle to improve wireless communication in accordance with various aspects of the present disclosure. In particular, the diagram 800B may correspond to a time instant that is a short period after the time instant of the diagram 800A. As shown in diagrams 800A and 800B, a vehicle UE 802 may be equipped with sensors, such as cameras, radars and/or lidars. Further, the vehicle UE 802 may be within the coverage area of a network node 806. In the coverage area of the network node 806, there may be static objects such as a building 822 as well as moving objects (e.g., trucks and buses). At the time instant of the diagram 800A, the network node 806 and a passenger UE 808 collocated with the vehicle UE 802 may communicate with each other using an LOS path 810 based on a network node beam 818a and a first UE beam 812a.

Leveraging its UE capability and the readings of the vehicle-sensors, the vehicle UE 802 may be aware of the location of the network node 806 and information about the oncoming vehicle 820. Further, the vehicle UE 802 may be aware of its own position and velocity, which, in some examples, may be provided by the on-board inertial measurement unit (IMU) and/or the on-board global positioning system (GPS) module.

In one or more aspects, based on the above information (e.g., the location of the network node 806, the information about the oncoming vehicle 820, the position of the vehicle UE 802, and/or the velocity of the vehicle UE 802), at the time instant of the diagram 800A, the machine learning inference model deployed at the vehicle UE 802 may provide an inference result that may predict that the LOS path 810 between the network node 806 and the passenger UE 808 may be blocked in the near future by the oncoming vehicle 820. As a result, if the same beams (e.g., beams 812a and 818a) are used without change, the communication between the network node 806 and the passenger UE 808 may be disrupted in the near future (e.g., the beam pair link quality between the network node 806 and the passenger UE 808 may degrade). Accordingly, the vehicle UE 802 may transmit the inference result to the network node 806 (e.g., via a lower band link, such as an FR1 link).

At the time instant of the diagram 800B, the LOS path 810 between the network node 806 and the passenger UE 808 may indeed be blocked by the vehicle 820, as predicted by the inference result. However, based on the inference result received from the vehicle UE 802, the network node 806 may switch the active network node beam from the beam 818a to the beam 818b (which may correspond to, e.g., changing a steering direction of the network node beam, changing an angle-of-departure (AoD) of the network node beam, or switch to a network node beam with a different beam index, etc.) before the LOS path 810 becomes blocked, so that the network node 806 may have continued unblocked communication with the passenger UE 808. Further, also based on the inference result received from the vehicle UE 802, the passenger UE 808 may switch the active passenger UE beam from the beam 812a to the beam 812b (which may correspond to, e.g., switching a direction of the active passenger UE beam), such that subsequent to the switches at both the network node 806 and the passenger UE 808, the network node 806 and the passenger UE 808 may continue to communicate with each other with an undegraded beam pair link quality using a reflected path 814 including a reflection point at the building 822 based on the new network node beam 818b and the new UE beam 812b.

Aspects of the disclosure may relate to approaches, signaling procedures, and/or parameters used for device and/or service discovery to enable pairing of the first UE (the passenger UE) and the second UE (the vehicle UE). Additional aspects may relate to approaches, signaling procedures, and/or parameters used for configuring the machine learning inference service at the second UE (the vehicle UE) by the network node.

In some aspects, an approach of direct UE-to-UE device and/or service discovery may be utilized. In particular, in one configuration, a UE (a passenger UE or a vehicle UE) may transmit (e.g., broadcast) one or more probing requests to neighboring devices in order to initiate the pairing process. In another configuration, a UE (a passenger UE or a vehicle UE) may transmit (e.g., broadcast) a message to announce its presence to neighboring UEs in order to initiate the pairing process.

In some aspects, device and/or service discovery for the machine learning data services may be performed with the assistance and/or management of a network node. In one configuration, the network node may configure the machine learning inference at the second UE (the vehicle UE).

In one or more aspects, the machine learning inference model hosted at the second UE (the vehicle UE) may include two (sub-)models that may be used together: A first model (Model 1) may be common to all network node beam indices, whereas each model component of the second model (Model 2) may be associated with a respective beam index (e.g., a respective transmission beam, a respective beam steering direction, or a respective beam AoD). Herein in some examples, the terms model or sub-model may be used interchangeably.

In one or more aspects, the network node may select the network node beams whose associated beam pair link quality is to be monitored. For each of the network node beams whose associated beam pair link quality is to be monitored, the network node may configure a respective model component of Model 2 at the second UE (the vehicle UE).

In one or more aspects, the second UE (the vehicle UE) may perform the machine learning inference, and may transmit the inference result to the network node. In one configuration, based on the inference result, the network node may implement event triggered reporting. For example, if the output from the machine learning inference model (e.g., the inference result) is greater than a prespecified threshold, the network node may generate a report. In another configuration, the network node may switch (the direction of) the network node beam if the inference result predicts that the degree of beam pair link quality degradation associated with a current network node beam is going to be greater than a prespecified threshold.

Figure 9:
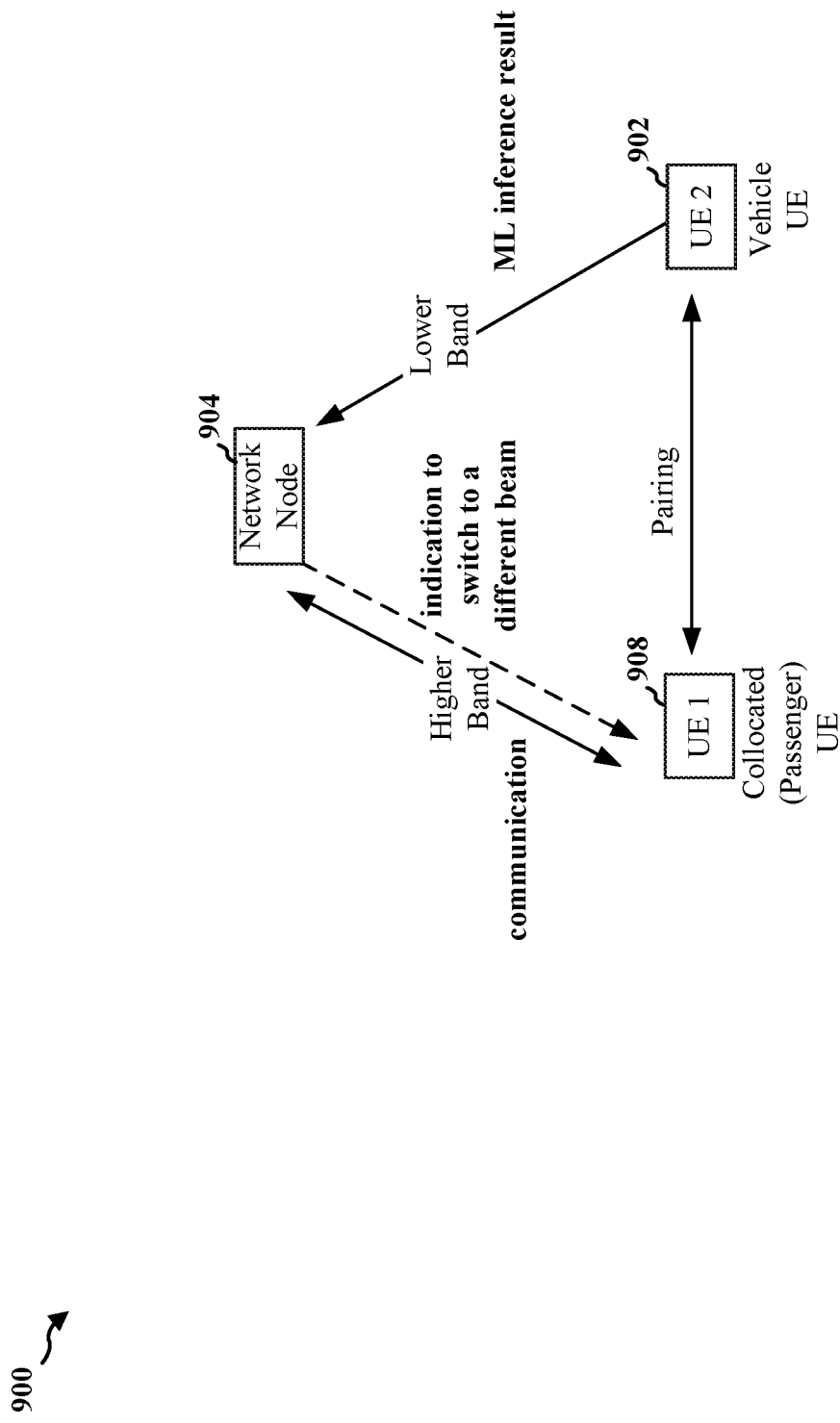
FIG. 9 is a diagram 900 illustrating an example of network node assisted or managed device and/or service discovery according to one or more aspects.

FIG. 9 is a diagram 900 illustrating an example of network node assisted or managed device and/or service discovery according to one or more aspects. In some examples, the first UE 908 (the passenger UE) may be connected to the network node 904 with a higher band link (e.g., an FR2 link), which may be associated with a higher bandwidth. Further, the second UE 902 (the vehicle UE) may be connected to the network node 904 with a lower band link (e.g. an FR1 link), which may be associated with a lower bandwidth. In one aspect, the first UE 908 (the passenger UE) and the second UE 902 (the vehicle UE) may complete the pairing process with the assistance from the network node 904. In one configuration, the first UE 908 (the passenger UE) and/or the second UE 902 (the vehicle UE) may inform the network node 904 of the pairing between the first UE 908 (the passenger UE) and the second UE 902 (the vehicle UE).

In one or more configurations, the network node 904 may be aware of the sensing and machine learning inference capabilities of the second UE 902 (the vehicle UE) associated with predicting the beam pair link quality of the link between the first UE 908 (the passenger UE) and the network node 904 (which, in some examples, may be a higher band link).

In one or more configurations, the second UE 902 (the vehicle UE) may feed, as the input, the sensing information into the machine learning inference model. Further, the second UE 902 (the vehicle UE) may transmit the machine learning inference result to the network node 904 via the link between the network node 904 and the second UE 902 (the vehicle UE) (which, in some examples, may be a lower band link).

In one or more configurations, the machine learning inference model may be used to predict the beam pair link quality of the link between the network node 904 and the first UE 908 (the collocated/passenger UE) (which, in some examples, may be a higher band link). In some examples, the beam pair link quality of the link between the network node 904 and the first UE 908 (the collocated/passenger UE) may correspond to the probability of a beam on the link between the network node 904 and the first UE 908 (the collocated/passenger UE) being blocked.

Figure 10A:
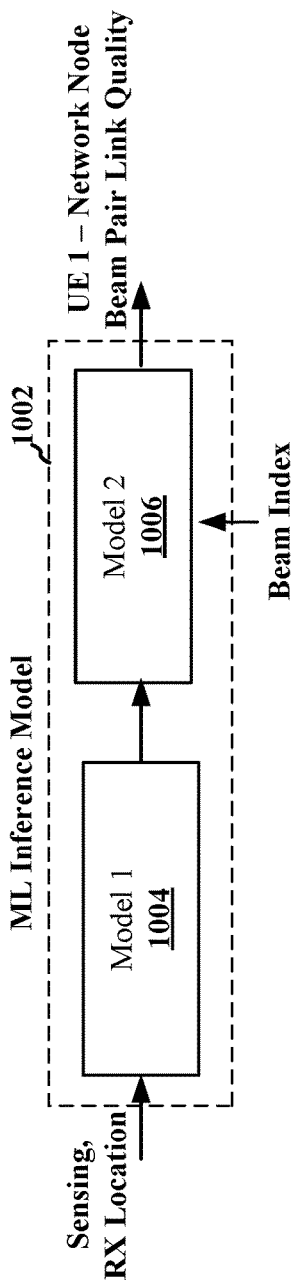
FIGS. 10A and 10B are diagrams illustrating an example of a machine learning model hosted at a vehicle UE according to one or more aspects.
Figure 10B:
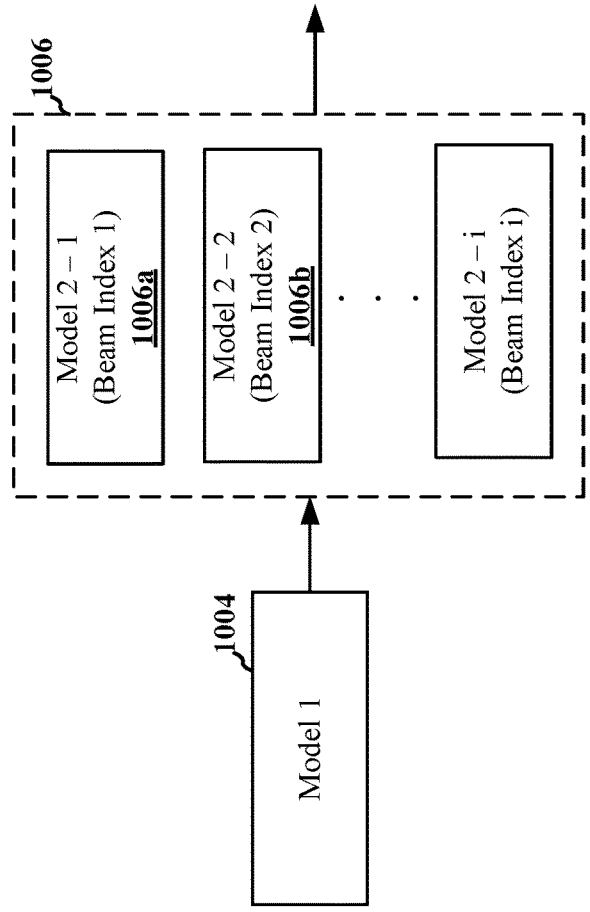

FIGS. 10A and 10B are diagrams 1000A and 1000B illustrating an example of a machine learning model hosted at a vehicle UE according to one or more aspects. As shown in the diagram 1000A, the machine learning inference model 1002 hosted at the second UE (the vehicle UE) may take, as the input, the sensing information as well as the location of the second UE (the vehicle UE) (e.g., in particular, the receiver location of the second UE), and may output a prediction of the beam pair link quality between the first UE (the passenger UE) and the network node (which, in some examples, may be a higher band link).

In one or more aspects, the machine learning inference model 1002 hosted at the second UE (the vehicle UE) may include two (sub-)models that may be used together: A first model 1004 (Model 1) may be common to all network node beam indices, whereas each model component of the second model 1006 (Model 2) may be associated with a respective beam index (e.g., a respective transmission beam, a respective beam steering direction, or a respective beam AoD). For example, a first model component 1006a of the second model 1006 (Model 2-1) may be associated with the network node beam with the beam index 1. For another example, a second model component 1006b of the second model 1006 (Model 2-2) may be associated with the network node beam with the beam index 2, and so on.

Figure 11:
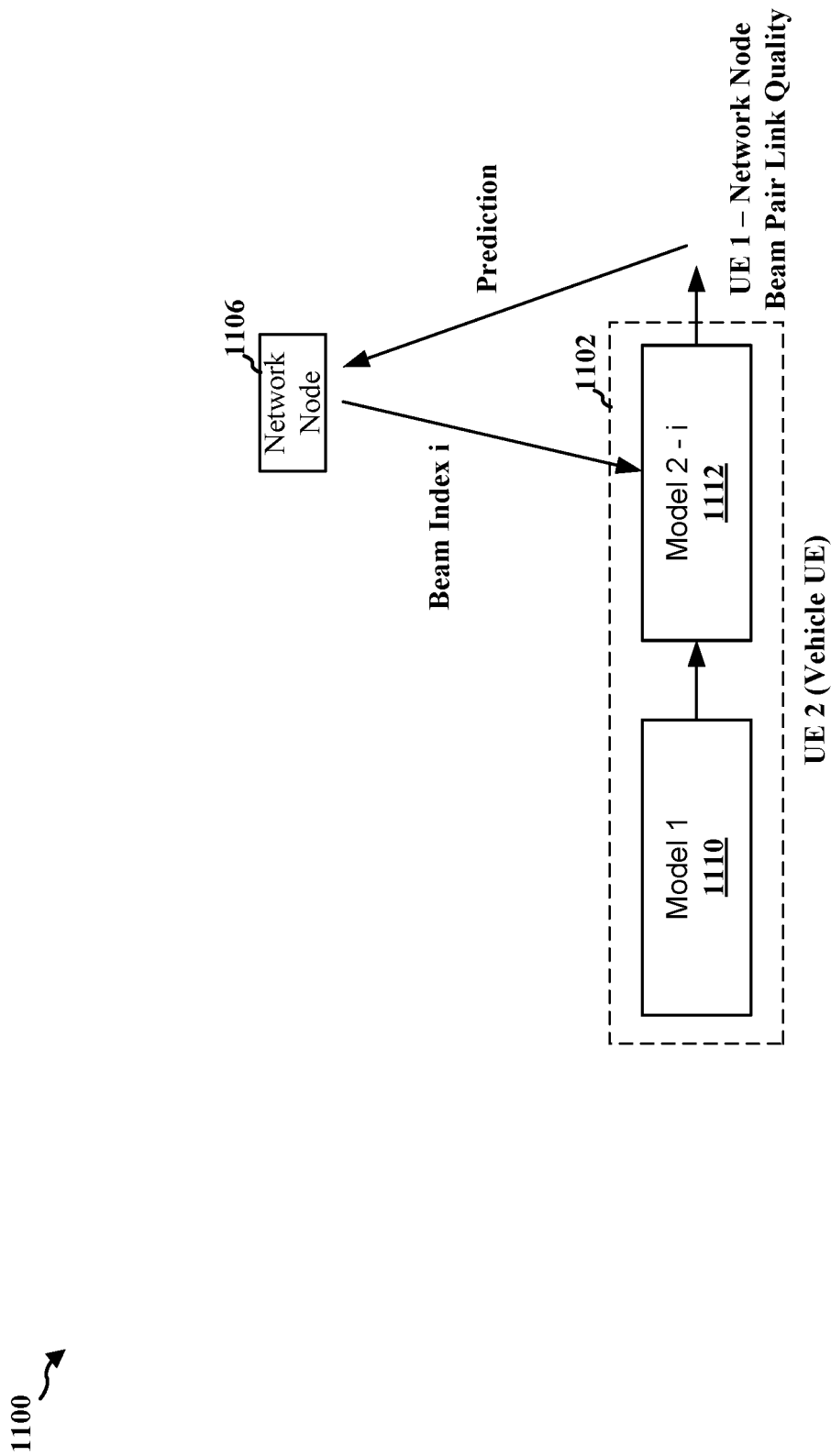
FIG. 11 is a diagram illustrating an example of generating a prediction associated with a network node beam based on a machine learning inference model hosted at the vehicle UE according to one or more aspects.

FIG. 11 is a diagram 1100 illustrating an example of generating a prediction associated with a network node beam based on a machine learning inference model hosted at the vehicle UE according to one or more aspects. To generate the inference result (e.g., the predicted link quality) associated with the network node beam with the beam index i, the second UE 1102 (the vehicle UE) may use the first model 1110 (Model 1) in combination with a respective model component 1112 of the second model (Model 2-i) associated with the beam index i.

In one or more aspects, the network node 1106 may select the network node beams whose associated beam pair link quality is to be monitored. For each of the network node beams whose associated beam pair link quality is to be monitored, the network node may configure a respective model component 1112 of the second model (Model 2) at the second UE 1102 (the vehicle UE).

In one or more aspects, the second UE 1102 (the vehicle UE) may perform the machine learning inference using the first model 1110 (Model 1) in combination with the respective model component 1112 of the second model (Model 2-i), and may transmit the inference result (e.g., the beam pair link quality prediction) to the network node 1106. In one configuration, based on the inference result, the network node 1106 may implement event triggered reporting. For example, if the output from the machine learning inference model (e.g., the inference result) is greater than a prespecified threshold, the network node 1106 may generate a report. In another configuration, the network node 1106 may switch (the direction of) the network node beam if the inference result predicts that the degree of beam pair link quality degradation associated with a current network node beam (e.g., the network node beam with the beam index i) is going to be greater than a prespecified threshold.

FIGS. 12A and 12B are diagrams of communication flows of methods of wireless communication. FIG. 12A is a diagram of a communication flow 1200A of a method of wireless communication where the first UE 1202 (e.g., the passenger UE) initiates the pairing process with the second UE 1204 (e.g., the vehicle UE) by transmitting a service discovery request message. At 1208, the first UE 1202 may transmit, to the second UE 1204, and the second UE 1204 may receive, from the first UE 1202, a service discovery request message indicating that the first UE 1202 (the passenger UE) is searching for a machine learning service provider in the vicinity (e.g., in the coverage area of the first UE 1202).

At 1210, the second UE 1204 may transmit, to the first UE 1202, and the first UE 1202 may receive, from the second UE 1204, a service discovery response message based on the service discovery request message 1208. The service discovery response message 1210 may indicate at least one of a machine learning service provider status associated with the second UE 1204 (e.g., that the second UE 1204 is a machine learning service provider), a machine learning service provider identifier (ID) associated with the second UE 1204, or information about one or more machine learning services provided by the second UE 1204. The information about the one or more machine learning services may include one or more of a machine learning application ID, a machine learning service ID, or an indication of one or more machine learning service types (e.g., sensor data collection, feature extraction, training, inference, etc.) or one or more machine learning service parameters (e.g., a data input format, a machine learning feature extraction model supported by the second UE 1204, or a machine learning inference model supported by the second UE 1204, etc.). In some examples, an application (which may be identified based on an application ID) may support more than one service (each of which may be identified based on a service ID). For example, a vehicle-to-everything (V2X) application may support basic safety service and sensor data sharing service, etc. As another example, a social media application may support chat service and video service, etc. Different services may have different QoS specifications. Herein a data input format may refer to the structure and/or encoding of the input data that may be used by the machine learning feature extraction and inference models. For example, the data input format may indicate one or more formats for different data types (e.g., text (character or string), number (Boolean, integer, fixed point, float point, real, complex, etc.), or meta (machine type, non-descriptive, etc.), and so on).

At 1212, the first UE 1202 may transmit, to the second UE 1204, and the second UE 1204 may receive, from the first UE 1202, a pairing request message based on the received service discovery response message 1210 or a capability of the first UE 1202 (e.g., the capability to update the UE information (which may include such first UE information as beam information, speed, direction, location, etc.), and/or the capability to provide the update to the second UE via the sidelink). The pairing request message 1212 may include at least one of a machine learning application ID, a machine learning service ID, the machine learning service provider ID associated with the second UE 1204, an indication of a machine learning service type, an indication of a machine learning feature extraction model supported by the second UE 1204, an indication of a machine learning inference model supported by the second UE 1204, or a machine learning service user ID associated with the first UE 1202.

At 1214, the second UE 1204 may transmit, to the first UE 1202, and the first UE 1202 may receive, from the second UE 1204, a pairing acknowledgement message based on the pairing request message 1212.

At 1218, the second UE 1204 may transmit, to a network node 1206, an inference result indicative of an upcoming blockage associated with a beam or a beam steering direction used for communication between the network node 1206 and the first UE 1202. The inference result may be generated based on one or more machine learning inference models. At least one machine learning inference model component in the one or more machine learning inference models may be associated with the beam or the beam steering direction.

At 1216, the first UE 1202 may receive, from a network node 1206, an indication to switch to a different beam for communicating with the network node 1206 based at least in part on one or more machine learning inference models.

FIG. 12B is a diagram of a communication flow 1200B of a method of wireless communication where the second UE 1254 (e.g., the vehicle UE) initiates the pairing process with the first UE 1252 (e.g., the passenger UE) by transmitting a service discovery request message. At 1258, the second UE 1254 may transmit, to the first UE 1252, and the first UE 1252 may receive, from the second UE 1254, a service discovery request message indicating that the second UE 1254 (e.g., the vehicle UE) is searching for a machine learning service user in the vicinity (e.g., a coverage area of the second UE 1254).

At 1260, the first UE 1252 may transmit, to the second UE 1254, and the second UE 1254 may receive, from the first UE 1252, a service discovery response message based on the service discovery request message 1258. The service discovery response message 1260 may indicate at least one of a machine learning service user status associated with the first UE 1252 (e.g., that the first UE 1252 is a machine learning service user), a machine learning service user ID associated with the first UE 1252, or information about one or more machine learning services searched for by the first UE 1252. The information about the one or more machine learning services searched for by the first UE 1252 may include one or more of a machine learning application ID, a machine learning service ID, or an indication of one or more machine learning service types (e.g., sensor data collection, feature extraction, training, inference, etc.) or one or more machine learning service parameters (e.g., a machine learning feature extraction model, or a machine learning inference model, etc.).

At 1262, the second UE 1254 may transmit, to the first UE 1252, and the first UE 1252 may receive, from the second UE 1254, a pairing request message based on the service discovery response message 1260 or a capability of the second UE 1254 (e.g., computation or storage capability for supporting sensor data collection, feature extraction, or machine learning inference, etc.). The pairing request message 1262 may include at least one of a machine learning application ID, a machine learning service ID, a machine learning service user ID associated with the first UE 1252, an indication of a machine learning service type, an indication of a machine learning feature extraction model supported by the second UE 1254, an indication of a machine learning inference model supported by the second UE 1254, or a machine learning service provider ID associated with the second UE 1254.

At 1264, the first UE 1252 may transmit, to the second UE 1254, and the second UE 1254 may receive, from the first UE 1252, a pairing acknowledgement message based on the pairing request message 1262.

At 1268, the second UE 1254 may transmit, to a network node 1256, an inference result indicative of an upcoming blockage associated with a beam or a beam steering direction used for communication between the network node 1256 and the first UE 1252. The inference result may be generated based on one or more machine learning inference models. At least one machine learning inference model component in the one or more machine learning inference models may be associated with the beam or the beam steering direction.

At 1266, the first UE 1252 may receive, from a network node 1256, an indication to switch to a different beam for communicating with the network node 1256 based at least in part on one or more machine learning inference models.

Figures 13A, 13B:
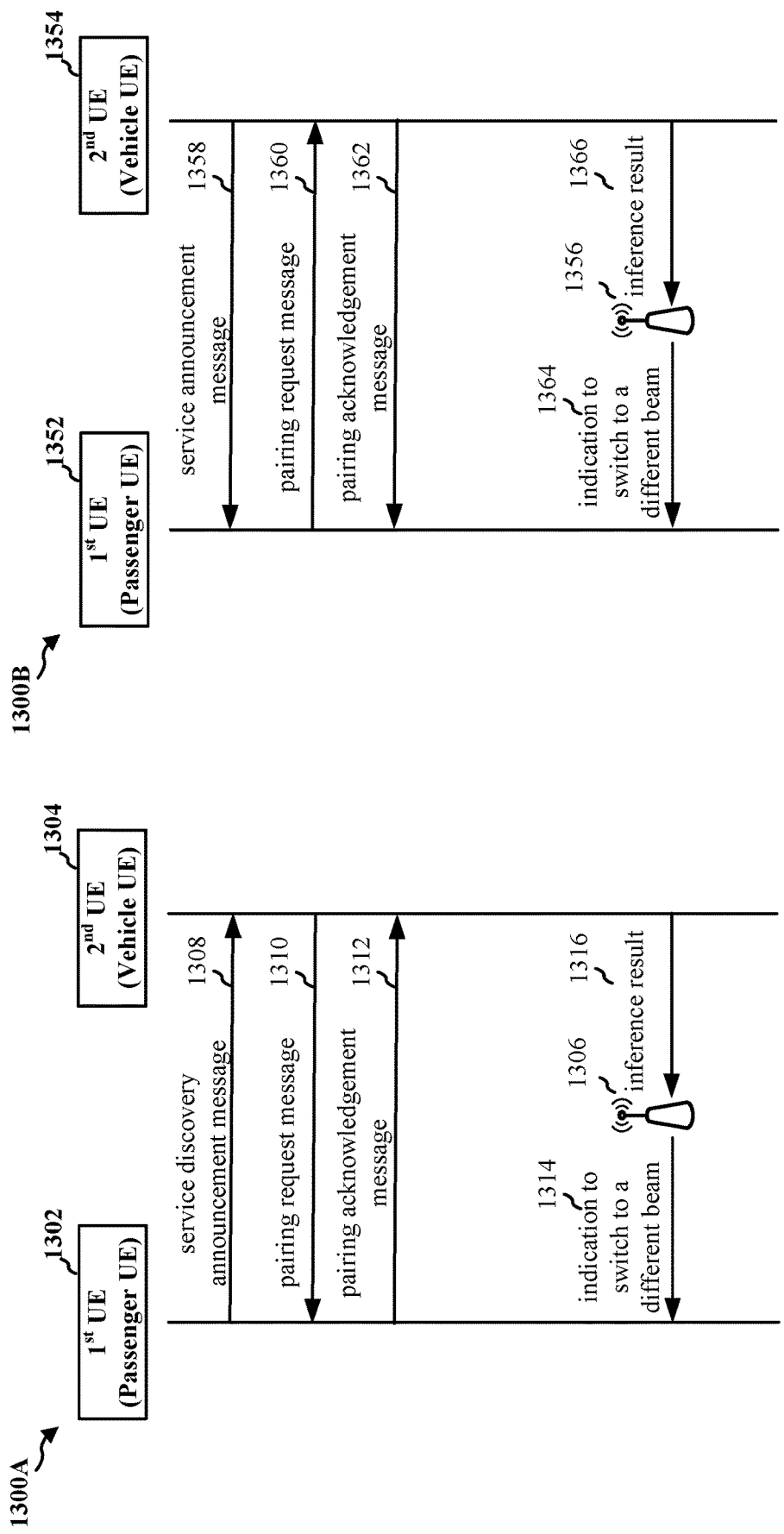
FIGS. 13A and 13B are diagrams of communication flows of methods of wireless communication.

FIGS. 13A and 13B are diagrams of communication flows of methods of wireless communication. FIG. 13A is a diagram of a communication flow 1300A of a method of wireless communication where the first UE 1302 (e.g., the passenger UE) initiates the pairing process with the second UE 1304 (e.g., the vehicle UE) by transmitting a service discovery announcement message. At 1308, the first UE 1302 may transmit, to the second UE 1304, and the second UE 1304 may receive, from the first UE 1302, a service discovery announcement message indicating one or more machine learning services that the first UE 1302 (e.g., the passenger UE) is searching for in the vicinity (e.g., a coverage area of the first UE 1302). The service discover announcement message 1308 may include at least one of a machine learning application ID, a machine learning service ID, a machine learning service user ID associated with the first UE 1302, or an indication of a machine learning service type or parameters. The machine learning service type may correspond to at least one of sensor data collection, feature extraction, training, inference, etc., and the machine learning service parameters may correspond to at least one of a data input format, one or more machine learning extraction models or one or more machine learning inference models supported by the second UE 1304.

At 1310, the second UE 1304 may transmit, to the first UE 1302, and the first UE 1302 may receive, from the second UE 1304, a pairing request message based on at least one of the service discovery announcement message 1308, a machine learning service provider ID associated with the second UE 1304 (which may be included in the service discovery announcement message 1308), or a capability of the second UE 1304 (e.g., computation or storage capability for supporting sensor data collection, feature extraction, or machine learning inference, etc.). The pairing request message 1310 may include at least one of the machine learning application ID, the machine learning service ID, the machine learning service user ID associated with the first UE 1302, the indication of the machine learning service type, an indication of one or more machine learning extraction models or an indication of the one or more machine learning inference models supported by the second UE 1304.

At 1312, the first UE 1302 may transmit, to the second UE 1304, and the second UE 1304 may receive, from the first UE 1302, a pairing acknowledgement message based on the pairing request message 1310.

At 1316, the second UE 1304 may transmit, to a network node 1306, an inference result indicative of an upcoming blockage associated with a beam or a beam steering direction used for communication between the network node 1306 and the first UE 1302. The inference result may be generated based on one or more machine learning inference models. At least one machine learning inference model component in the one or more machine learning inference models may be associated with the beam or the beam steering direction.

At 1314, the first UE 1302 may receive, from a network node 1306, an indication to switch to a different beam for communicating with the network node 1306 based at least in part on one or more machine learning inference models.

FIG. 13B is a diagram of a communication flow 1300B of a method of wireless communication where the second UE 1354 (e.g., the vehicle UE) initiates the pairing process with the first UE 1352 (e.g., the passenger UE) by transmitting a service announcement message. At 1358, the second UE 1354 may transmit, to the first UE 1352, and the first UE 1352 may receive, from the second UE 1354, a service announcement message indicating one or more machine learning services. The service announcement message may include at least one of a machine learning application ID, a machine learning service ID, a machine learning service provider ID associated with the second UE 1354, or an indication of a machine learning service type. The machine learning service type may correspond to at least one of sensor data collection, feature extraction, a data input format, one or more machine learning feature extraction models supported by the second UE 1354, or one or more machine learning inference models supported by the second UE 1354.

At 1360, the first UE 1352 may transmit, to the second UE 1354, and the second UE 1354 may receive, from the first UE 1352, a pairing request message based on at least one of the service announcement message 1358, a machine learning service user ID associated with the first UE 1352 (which may be included in the service announcement message 1358), or a capability of the first UE 1352 (e.g., the capability to update the UE information (which may include such first UE information as beam information, speed, direction, location, etc.), and/or the capability to provide the update to the second UE via the sidelink). The pairing request message 1360 may include at least one of the machine learning application ID, the machine learning service ID, the machine learning service provider ID associated with the second UE 1354, the indication of the machine learning service type, or an indication of the one or more machine learning inference models supported by the second UE 1354.

At 1362, the second UE 1354 may transmit, to the first UE 1352, and the first UE 1352 may receive, from the second UE 1354, a pairing acknowledgement message based on the pairing request message 1360.

At 1366, the second UE 1354 may transmit, to a network node 1356, an inference result indicative of an upcoming blockage associated with a beam or a beam steering direction used for communication between the network node 1356 and the first UE 1352. The inference result may be generated based on one or more machine learning inference models. At least one machine learning inference model component in the one or more machine learning inference models may be associated with the beam or the beam steering direction.

At 1364, the first UE 1352 may receive, from a network node 1356, an indication to switch to a different beam for communicating with the network node 1356 based at least in part on one or more machine learning inference models.

Figure 14:
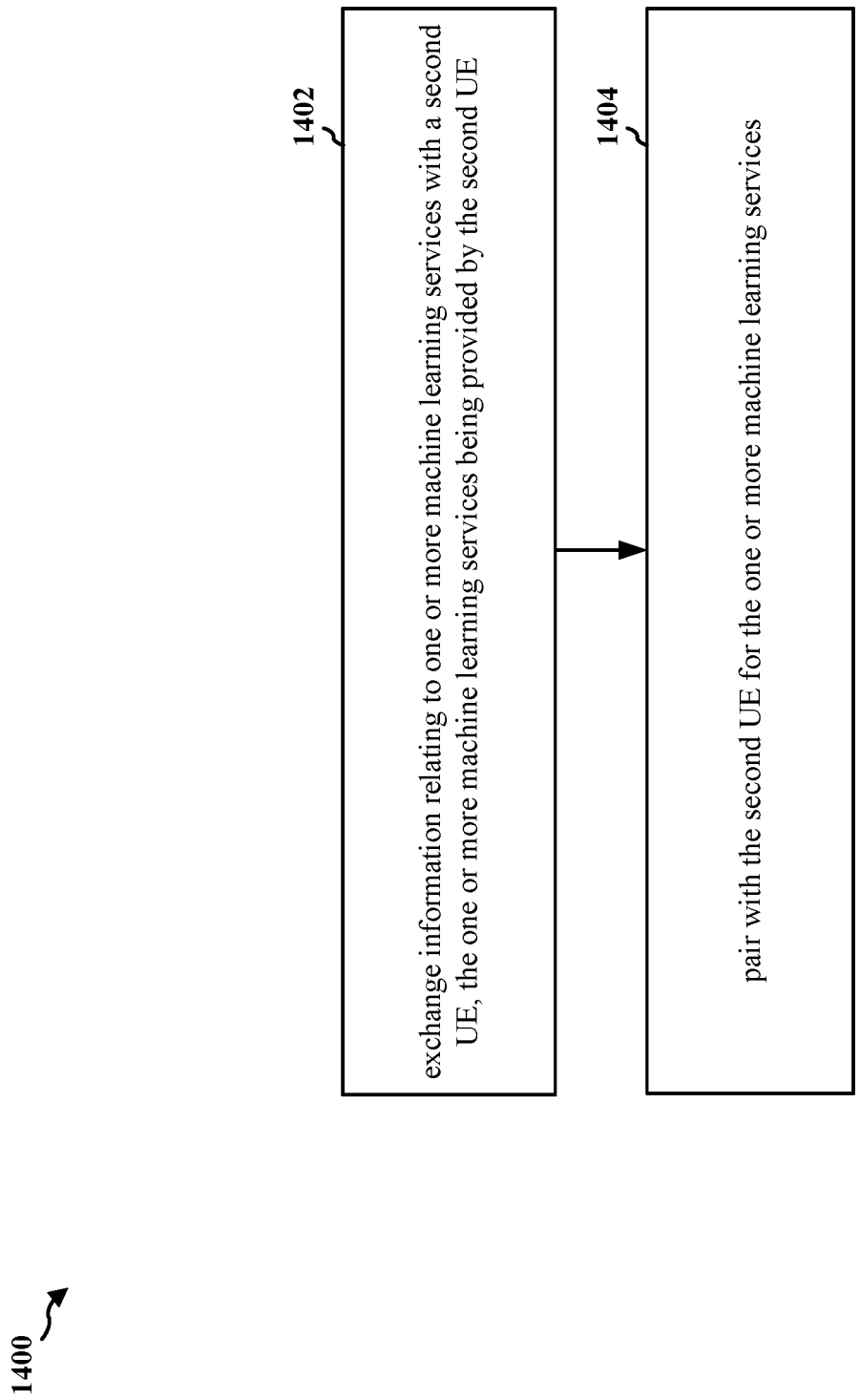
FIG. 14 is a flowchart of a method of wireless communication.

FIG. 14 is a flowchart 1400 of a method of wireless communication. The method may be performed by a first UE (e.g., the UE 104; the first UE 1202/1252/1302/1352; the apparatus 1802). At 1402, the first UE may exchange information relating to one or more machine learning services with a second UE. The one or more machine learning services may be provided by the second UE. For example, 1402 may be performed by the machine learning service component 1840 in FIG. 18. Referring to FIGS. 12A, 12B, 13A, and 13B, at 1208, 1210, 1258, 1260, 1308, and 1358 the first UE 1202/1252/1302/1352 may exchange information relating to one or more machine learning services with a second UE 1204/1254/1304/1354.

At 1404, the first UE may pair with the second UE for the one or more machine learning services. For example, 1404 may be performed by the machine learning service component 1840 in FIG. 18. Referring to FIGS. 12A, 12B, 13A, and 13B, at 1212, 1214, 1262, 1264, 1310, 1312, 1360, and 1362, the first UE 1202/1252/1302/1352 may pair with the second UE 1204/1254/1304/1354 for the one or more machine learning services.

Figure 15:
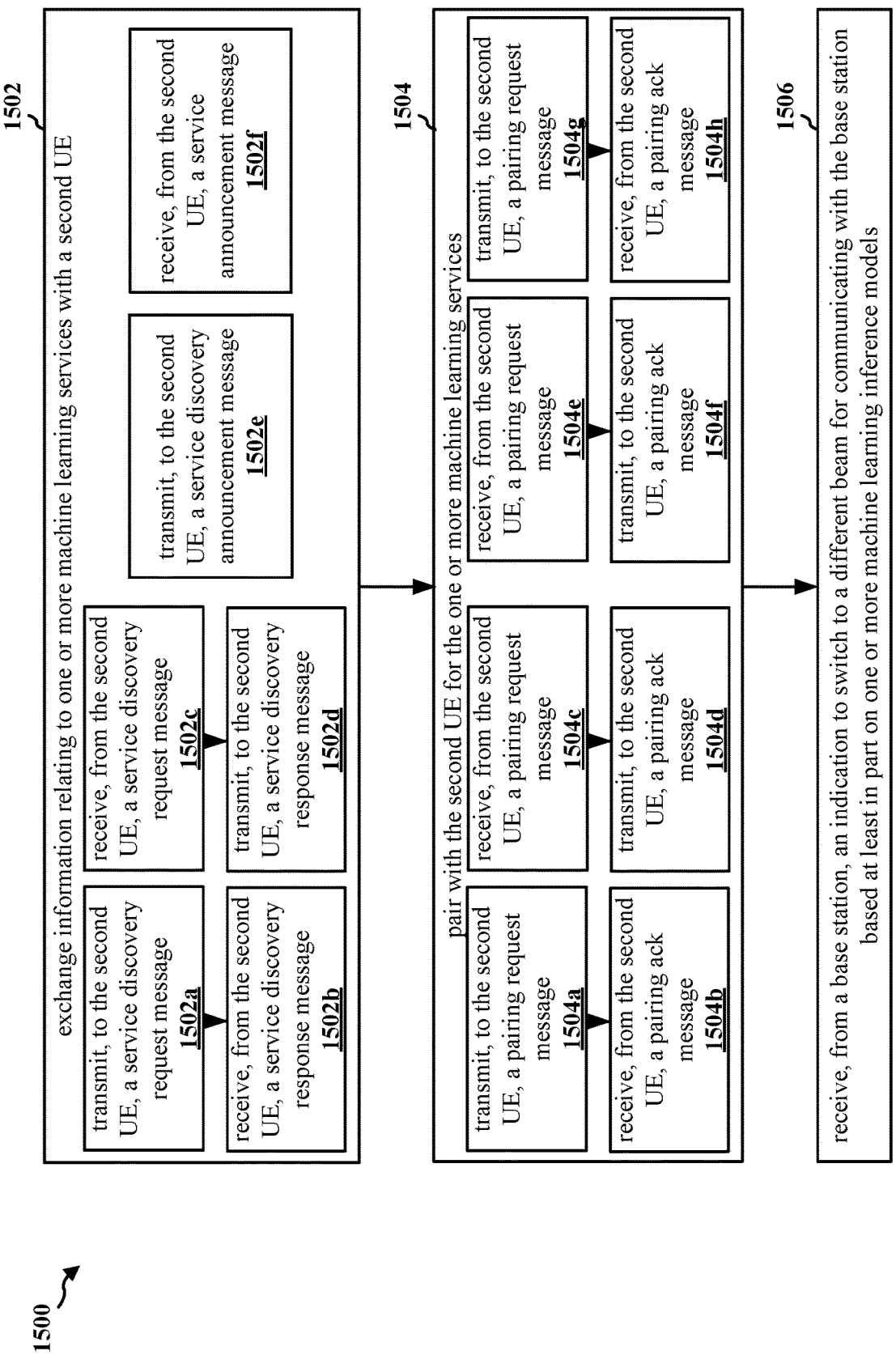
FIG. 15 is a flowchart of a method of wireless communication.

FIG. 15 is a flowchart 1500 of a method of wireless communication. The method may be performed by a first UE (e.g., the UE 104; the first UE 1202/1252/1302/1352; the apparatus 1802). At 1502, the first UE may exchange information relating to one or more machine learning services with a second UE. The one or more machine learning services may be provided by the second UE. For example, 1502 may be performed by the machine learning service component 1840 in FIG. 18. Referring to FIGS. 12A, 12B, 13A, and 13B, at 1208, 1210, 1258, 1260, 1308, and 1358 the first UE 1202/1252/1302/1352 may exchange information relating to one or more machine learning services with a second UE 1204/1254/1304/1354.

At 1504, the first UE may pair with the second UE for the one or more machine learning services. For example, 1504 may be performed by the machine learning service component 1840 in FIG. 18. Referring to FIGS. 12A, 12B, 13A, and 13B, at 1212, 1214, 1262, 1264, 1310, 1312, 1360, and 1362, the first UE 1202/1252/1302/1352 may pair with the second UE 1204/1254/1304/1354 for the one or more machine learning services.

In one configuration, to exchange the information relating to the one or more machine learning services with the second UE, at 1502a, the first UE may transmit, to the second UE, a service discovery request message indicating that the first UE is searching for a machine learning service provider. For example, 1502a may be performed by the machine learning service component 1840 in FIG. 18. Referring to FIG. 12A, at 1208, the first UE 1202 may transmit, to the second UE 1204, a service discovery request message indicating that the first UE is searching for a machine learning service provider.

At 1502b, the first UE may receive, from the second UE, a service discovery response message based on the service discovery request message. For example, 1502b may be performed by the machine learning service component 1840 in FIG. 18. Referring to FIG. 12A, at 1210, the first UE 1202 may receive, from the second UE 1204, a service discovery response message based on the service discovery request message 1208.

In one configuration, referring to FIG. 12A, the service discovery request message 1208 may indicate at least one of a machine learning service user ID associated with the first UE 1202 or that the first UE 1202 is a user of the one or more machine learning services.

In one configuration, referring to FIG. 12A, the service discovery response message 1210 may indicate at least one of a machine learning service provider status associated with the second UE, a machine learning service provider ID associated with the second UE, information about the one or more machine learning services provided by the second UE, a machine learning application ID, a machine learning service ID, an indication of a machine learning service type, or an indication of one or more machine learning service parameters. The machine learning service type may correspond to at least one of sensor data collection, feature extraction, or inference. The one or more machine learning service parameters may correspond to at least one of a data input format, a machine learning feature extraction model supported by the second UE, or a machine learning inference model supported by the second UE.

In one configuration, to pair with the second UE for the one or more machine learning services, at 1504a, the first UE may transmit, to the second UE, a pairing request message based on the received service discovery response message or a capability of the first UE. The pairing request message may include at least one of a machine learning application ID, a machine learning service ID, a machine learning service provider ID associated with the second UE, an indication of a machine learning service type, an indication of a machine learning feature extraction model supported by the second UE, an indication of a machine learning inference model supported by the second UE, or a machine learning service user ID associated with the first UE. For example, 1504a may be performed by the machine learning service component 1840 in FIG. 18. Referring to FIG. 12A, at 1212, the first UE 1202 may transmit, to the second UE 1204, a pairing request message based on the received service discovery response message 1210 or a capability of the first UE 1202.

At 1504b, the first UE may receive, from the second UE, a pairing acknowledgement message based on the pairing request message. For example, 1504b may be performed by the machine learning service component 1840 in FIG. 18. Referring to FIG. 12A, at 1214, the first UE 1202 may receive, from the second UE 1204, a pairing acknowledgement message based on the pairing request message 1212.

In one configuration, to exchange the information relating to the one or more machine learning services with the second UE, at 1502c, the first UE may receive, from the second UE, a service discovery request message indicating that the second UE is searching for a machine learning service user. For example, 1502c may be performed by the machine learning service component 1840 in FIG. 18. Referring to FIG. 12B, at 1258, the first UE 1252 may receive, from the second UE 1254, a service discovery request message indicating that the second UE is searching for a machine learning service user.

At 1502d, the first UE may transmit, to the second UE, a service discovery response message based on the service discovery request message. For example, 1502d may be performed by the machine learning service component 1840 in FIG. 18. Referring to FIG. 12B, at 1260, the first UE 1252 may transmit, to the second UE 1254, a service discovery response message based on the service discovery request message 1258.

In one configuration, referring to FIG. 12B, the service discovery request message 1258 may indicate at least one of a machine learning service provider ID associated with the second UE 1254 or that the second UE 1254 is a provider of the one or more machine learning services.

In one configuration, referring to FIG. 12B, the service discovery response message 1260 may indicate at least one of a machine learning service user status associated with the first UE, a machine learning service user ID associated with the first UE, a machine learning application identifier ID, a machine learning service ID, an indication of a machine learning service type, or an indication of one or more machine learning service parameters. The machine learning service type may correspond to at least one of sensor data collection, feature extraction, or inference. The one or more machine learning service parameters may correspond to at least one of a data input format, a machine learning feature extraction mode supported by the second UE, or a machine learning inference model supported by the second UE.

In one configuration, to pair with the second UE for the one or more machine learning services, at 1504c, the first UE may receive, from the second UE, a pairing request message based on the transmitted service discovery response message or a capability of the second UE. The pairing request message may include at least one of a machine learning application ID, a machine learning service ID, a machine learning service user ID associated with the first UE, an indication of a machine learning service type, an indication of a machine learning feature extraction model supported by the second UE, an indication of a machine learning inference model supported by the second UE, or a machine learning service provider ID associated with the second UE. For example, 1504c may be performed by the machine learning service component 1840 in FIG. 18. Referring to FIG. 12B, at 1262, the first UE 1252 may receive, from the second UE 1254, a pairing request message based on the transmitted service discovery response message 1260 or a capability of the second UE 1254.

At 1504d, the first UE may transmit, to the second UE, a pairing acknowledgement message based on the pairing request message. For example, 1504d may be performed by the machine learning service component 1840 in FIG. 18. Referring to FIG. 12B, at 1264, the first UE 1252 may transmit, to the second UE 1254, a pairing acknowledgement message based on the pairing request message 1262.

In one configuration, to exchange the information relating to the one or more machine learning services with the second UE, at 1502e, the first UE may transmit, to the second UE, a service discovery announcement message indicating that the first UE is searching for the one or more machine learning services. The service discovery announcement message may include at least one of a machine learning application ID, a machine learning service ID, a machine learning service user ID associated with the first UE, an indication of a machine learning service type, or an indication of one or more machine learning service parameters. The machine learning service type may correspond to at least one of sensor data collection, feature extraction, or inference. The one or more machine learning service parameters may correspond to at least one of a data input format, a machine learning feature extraction model supported by the second UE, or a machine learning inference model supported by the second UE. For example, 1502e may be performed by the machine learning service component 1840 in FIG. 18. Referring to FIG. 13A, at 1308, the first UE 1302 may transmit, to the second UE 1304, a service discovery announcement message indicating the one or more machine learning services.

In one configuration, to pair with the second UE for the one or more machine learning services, at 1504e, the first UE may receive, from the second UE, a pairing request message based on at least one of the transmitted service discovery announcement message, a machine learning service provider ID associated with the second UE, or a capability of the second UE. For example, 1504e may be performed by the machine learning service component 1840 in FIG. 18. Referring to FIG. 13A, at 1310, the first UE 1302 may receive, from the second UE 1304, a pairing request message based on at least one of the transmitted service discovery announcement message 1308, a machine learning service provider ID associated with the second UE 1304, or a capability of the second UE 1304.

In one configuration, at 1504f, the first UE may transmit, to the second UE, a pairing acknowledgement message based on the pairing request message. For example, 1504f may be performed by the machine learning service component 1840 in FIG. 18. Referring to FIG. 13A, at 1312, the first UE 1302 may transmit, to the second UE 1304, a pairing acknowledgement message based on the pairing request message 1310.

In one configuration, to exchange the information relating to the one or more machine learning services with the second UE, at 1502f, the first UE may receive, from the second UE, a service announcement message indicating the one or more machine learning services. The service announcement message may include at least one of a machine learning application ID, a machine learning service ID, a machine learning service provider ID associated with the second UE, an indication of a machine learning service type, or an indication of one or more machine learning service parameters. The machine learning service type may correspond to at least one of sensor data collection, feature extraction, or inference. The one or more machine learning service parameters may correspond to at least one of a data input format, a machine learning feature extraction model supported by the second UE, or a machine learning inference model supported by the second UE. For example, 1502f may be performed by the machine learning service component 1840 in FIG. 18. Referring to FIG. 13B, at 1358, the first UE 1352 may receive, from the second UE 1354, a service announcement message indicating the one or more machine learning services.

In one configuration, to pair with the second UE for the one or more machine learning service, at 1504g, the first UE may transmit, to the second UE, a pairing request message based on at least one of the received service announcement message, a machine learning service user ID associated with the first UE, or a capability of the first UE. For example, 1504g may be performed by the machine learning service component 1840 in FIG. 18. Referring to FIG. 13B, at 1360, the first UE 1352 may transmit, to the second UE 1354, a pairing request message based on at least one of the received service announcement message 1358, a machine learning service user ID associated with the first UE 1352, or a capability of the first UE 1352.

At 1504h, the first UE may receive, from the second UE, a pairing acknowledgement message based on the pairing request message. For example, 1504h may be performed by the machine learning service component 1840 in FIG. 18. Referring to FIG. 13B, at 1362, the first UE 1352 may receive, from the second UE 1354, a pairing acknowledgement message based on the pairing request message 1360.

In one configuration, at 1506, the first UE may receive, from a network node, an indication to switch to a different beam for communicating with the network node based at least in part on one or more machine learning inference models. For example, 1506 may be performed by the machine learning service component 1840 in FIG. 18. Referring to FIGS. 12A, 12B, 13A, and 13B, at 1216, 1266, 1314, and 1364, the first UE 1202/1252/1302/1352 may receive, from a network node 1206/1256/1306/1356, an indication to switch to a different beam for communicating with the network node 1206/1256/1306/1356 based at least in part on one or more machine learning inference models.

Figure 16:
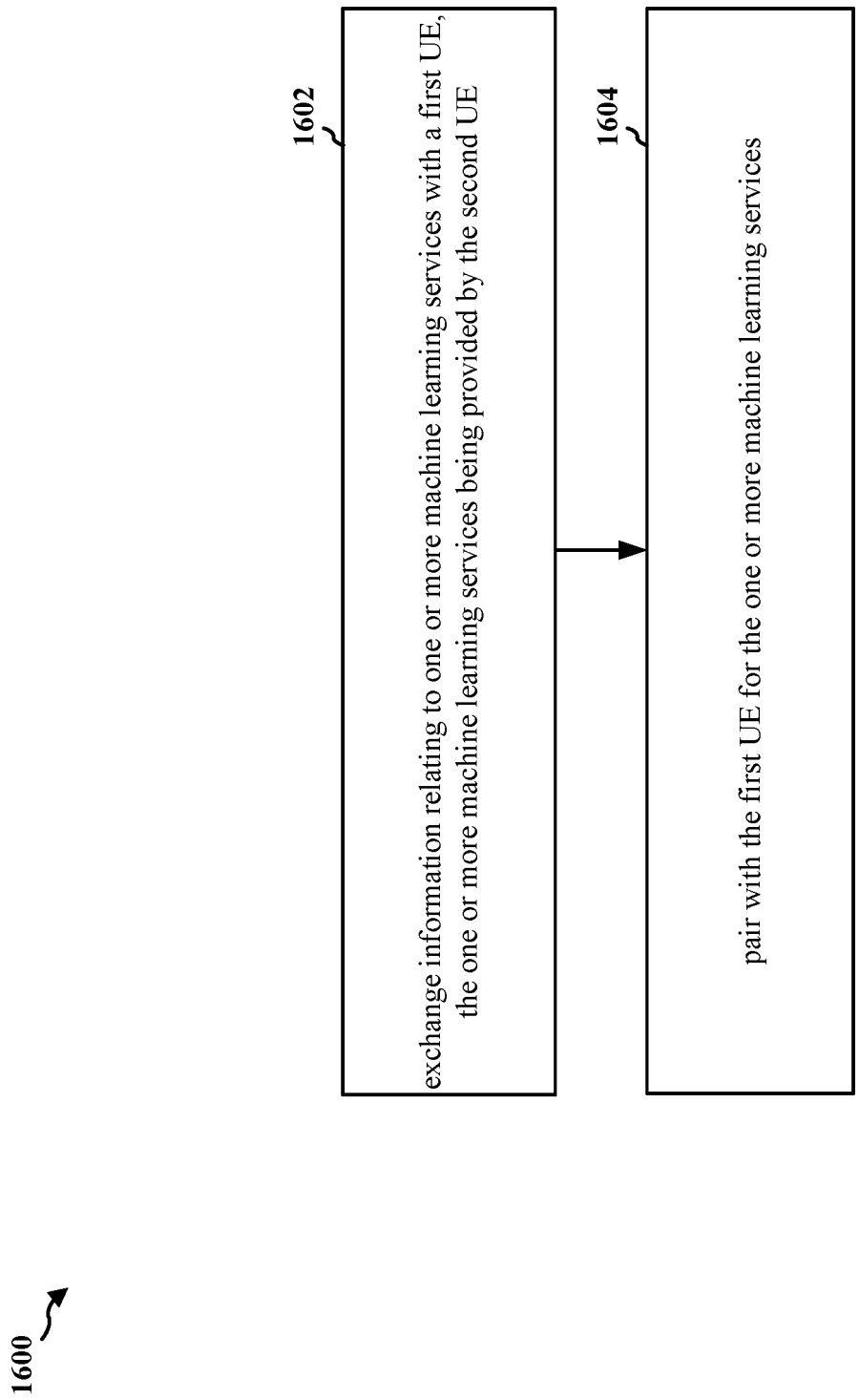
FIG. 16 is a flowchart of a method of wireless communication.

FIG. 16 is a flowchart 1600 of a method of wireless communication. The method may be performed by a second UE (e.g., the UE 104'; the second UE 1204/1254/1304/1354; the apparatus 1902). At 1602, the second UE may exchange information relating to one or more machine learning services with a first UE. The one or more machine learning services may be provided by the second UE. For example, 1602 may be performed by the machine learning service component 1940 in FIG. 19. Referring to FIGS. 12A, 12B, 13A, and 13B, at 1208, 1210, 1258, 1260, 1308, and 1358 the second UE 1204/1254/1304/1354 may exchange information relating to one or more machine learning services with a first UE 1202/1252/1302/1352.

At 1604, the second UE may pair with the first UE for the one or more machine learning services. For example, 1604 may be performed by the machine learning service component 1940 in FIG. 19. Referring to FIGS. 12A, 12B, 13A, and 13B, at 1212, 1214, 1262, 1264, 1310, 1312, 1360, and 1362, the second UE 1204/1254/1304/1354 may pair with the first UE 1202/1252/1302/1352 for the one or more machine learning services.

Figure 17:
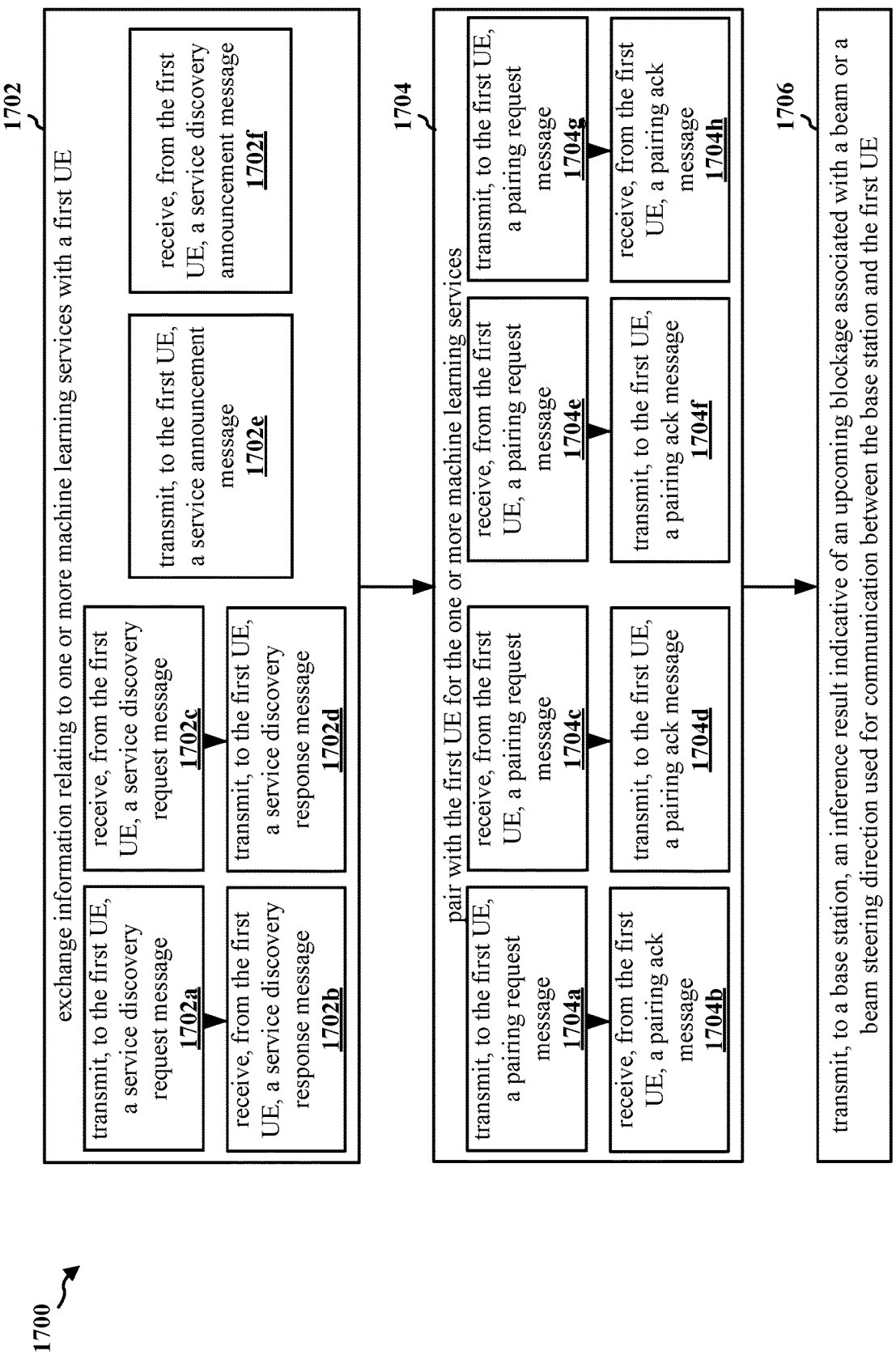
FIG. 17 is a flowchart of a method of wireless communication.

FIG. 17 is a flowchart 1700 of a method of wireless communication. The method may be performed by a second UE (e.g., the UE 104'; the second UE 1204/1254/1304/1354; the apparatus 1902). At 1702, the second UE may exchange information relating to one or more machine learning services with a first UE. The one or more machine learning services may be provided by the second UE. For example, 1702 may be performed by the machine learning service component 1940 in FIG. 19. Referring to FIGS. 12A, 12B, 13A, and 13B, at 1208, 1210, 1258, 1260, 1308, and 1358 the second UE 1204/1254/1304/1354 may exchange information relating to one or more machine learning services with a first UE 1202/1252/1302/1352.

At 1704, the second UE may pair with the first UE for the one or more machine learning services. For example, 1704 may be performed by the machine learning service component 1940 in FIG. 19. Referring to FIGS. 12A, 12B, 13A, and 13B, at 1212, 1214, 1262, 1264, 1310, 1312, 1360, and 1362, the second UE 1204/1254/1304/1354 may pair with the first UE 1202/1252/1302/1352 for the one or more machine learning services.

In one configuration, to exchange the information relating to the one or more machine learning services with the first UE, at 1702a, the second UE may transmit, to the first UE, a service discovery request message indicating the one or more machine learning services. For example, 1702a may be performed by the machine learning service component 1940 in FIG. 19. Referring to FIG. 12B, at 1258, the second UE 1254 may transmit, to the first UE 1252, a service discovery request message indicating the one or more machine learning services.

At 1702b, the second UE may receive, from the first UE, a service discovery response message based on the service discovery request message. For example, 1702b may be performed by the machine learning service component 1940 in FIG. 19. Referring to FIG. 12B, at 1260, the second UE 1254 may receive, from the first UE 1252, a service discovery response message based on the service discovery request message 1258.

In one configuration, referring to FIG. 12B, the service discovery request message 1258 may indicate at least a machine learning service provider ID associated with the second UE 1254 or that the second UE 1254 is a provider of the one or more machine learning services.

In one configuration, referring to FIG. 12B, the service discovery response message 1260 may include at least one of a machine learning application ID, a machine learning service ID, a machine learning service user ID associated with the first UE, an indication of a machine learning service type, or an indication of one or more machine learning service parameters. The machine learning service type may correspond to at least one of sensor data collection, feature extraction, or inference. The one or more machine learning service parameters may correspond to at least one of a data input format, a machine learning feature extraction model supported by the second UE, or a machine learning inference model supported by the second UE.

In one configuration, to pair with the first UE for the one or more machine learning services, at 1704a, the second UE may transmit, to the first UE, a pairing request message based on the received service discovery response message or a capability of the second UE. The pairing request message may include at least one of a machine learning application ID, a machine learning service ID, a machine learning service user ID associated with the first UE, an indication of a machine learning service type, or an indication of one or more supported machine learning inference models. For example, 1704a may be performed by the machine learning service component 1940 in FIG. 19. Referring to FIG. 12B, at 1262, the second UE 1254 may transmit, to the first UE 1252, a pairing request message based on the received service discovery response message 1260 or a capability of the second UE 1254.

At 1704b, the second UE may receive, from the first UE, a pairing acknowledgement message based on the pairing request message. For example, 1704b may be performed by the machine learning service component 1940 in FIG. 19. Referring to FIG. 12B, at 1264, the second UE 1254 may receive, from the first UE 1252, a pairing acknowledgement message based on the pairing request message 1262.

In one configuration, to exchange the information relating to the one or more machine learning services with the first UE, at 1702c, the second UE may receive, from the first UE, a service discovery request message indicating that the first UE is searching for a machine learning service provider. For example, 1702c may be performed by the machine learning service component 1940 in FIG. 19. Referring to FIG. 12A, at 1208, the second UE 1204 may receive, from the first UE 1202, a service discovery request message indicating that the first UE is searching for a machine learning service provider.

At 1702*d*, the second UE may transmit, to the first UE, a service discovery response message based on the service discovery request message. For example, 1702*d* may be performed by the machine learning service component 1940 in FIG. 19. Referring to FIG. 12A, at 1210, the second UE 1204 may transmit, to the first UE 1202, a service discovery response message based on the service discovery request message 1208.

In one configuration, referring to FIG. 12A, the service discovery request message 1208 may indicate at least one of a machine learning service user ID associated with the first UE 1202 or that the first UE 1202 is a user of the one or more machine learning services.

In one configuration, referring to FIG. 12A, the service discovery response message 1210 may include at least one of a machine learning application ID, a machine learning service ID, a machine learning service provider ID associated with the second UE, an indication of a machine learning service type, or an indication of one or more machine learning service parameters. The machine learning service type may correspond to at least one of sensor data collection, feature extraction, or inference. The one or more machine learning service parameters may correspond to at least one of a data input format, a machine learning feature extraction model supported by the second UE, or a machine learning inference model supported by the second UE.

In one configuration, to pair with the first UE for the one or more machine learning services, at 1704*c*, the second UE may receive, from the first UE, a pairing request message based on the transmitted service discovery response message or a capability of the first UE. The pairing request message may include at least one of a machine learning application ID, a machine learning service ID, a machine learning service provider ID associated with the second UE, an indication of a machine learning service type, or an indication of one or more supported machine learning inference models. For example, 1704*c* may be performed by the machine learning service component 1940 in FIG. 19. Referring to FIG. 12A, at 1212, the second UE 1204 may receive, from the first UE 1202, a pairing request message based on the transmitted service discovery response message 1210 or a capability of the first UE 1202.

At 1704*d*, the second UE may transmit, to the first UE, a pairing acknowledgement message based on the pairing request message. For example, 1704*d* may be performed by the machine learning service component 1940 in FIG. 19. Referring to FIG. 12A, at 1214, the second UE 1204 may transmit, to the first UE 1202, a pairing acknowledgement message based on the pairing request message 1212.

In one configuration, to exchange the information relating to the one or more machine learning services with the first UE, at 1702*e*, the second UE may transmit, to the first UE, a service announcement message indicating the one or more machine learning services. The service announcement message may include at least one of a machine learning application ID, a machine learning service ID, a machine learning service provider ID associated with the second UE, or an indication of a machine learning service type, or an indication of one or more machine learning service parameters, wherein the machine learning service type corresponds to at least one of sensor data collection, feature extraction, or inference, and the one or more machine learning service parameters correspond to at least one of a data input format, a machine learning feature extraction model supported by the second UE, or a machine learning inference model supported by the second UE.

In one configuration, to pair with the first UE for the one or more machine learning services, at 1704*e*, the second UE may receive, from the first UE, a pairing request message based on at least one of the transmitted service announcement message, a machine learning service user ID associated with the first UE, or a capability of the first UE. For example, 1704*e* may be performed by the machine learning service component 1940 in FIG. 19. Referring to FIG. 13B, at 1360, the second UE 1354 may receive, from the first UE 1352, a pairing request message based on at least one of the transmitted service announcement message 1358, a machine learning service user ID associated with the first UE 1352, or a capability of the first UE 1352.

At 1704*f*, the second UE may transmit, to the first UE, a pairing acknowledgement message based on the pairing request message. For example, 1704*f* may be performed by the machine learning service component 1940 in FIG. 19. Referring to FIG. 13B, at 1362, the second UE 1354 may transmit, to the first UE 1352, a pairing acknowledgement message based on the pairing request message 1360.

In one configuration, to exchange the information relating to the one or more machine learning services with the first UE, at 1702*f*, the second UE may receive, from the first UE, a service discovery announcement message indicating the one or more machine learning services. The service discovery announcement message may include at least one of a machine learning application ID, a machine learning service ID, a machine learning service user ID associated with the first UE, an indication of a machine learning service type, or an indication of one or more machine learning service parameters. The machine learning service type may correspond to at least one of sensor data collection, feature extraction, or inference. The one or more machine learning service parameters may correspond to at least one of a data input format, a machine learning feature extraction model supported by the second UE, or a machine learning inference model supported by the second UE. For example, 1702*f* may be performed by the machine learning service component 1940 in FIG. 19. Referring to FIG. 13A, at 1308, the second UE 1304 may receive, from the first UE 1302, a service discovery announcement message indicating the one or more machine learning services.

In one configuration, to pair with the first UE for the one or more machine learning services, at 1704*g*, the second UE may transmit, to the first UE, a pairing request message based on at least one of the received service discovery announcement message, a machine learning service provider ID associated with the second UE, or a capability of the second UE. For example, 1704*g* may be performed by the machine learning service component 1940 in FIG. 19. Referring to FIG. 13A, at 1310, the second UE 1304 may transmit, to the first UE 1302, a pairing request message based on at least one of the received service discovery announcement message 1308, a machine learning service provider ID associated with the second UE 1304, or a capability of the second UE 1304.

At 1704*h*, the second UE may receive, from the first UE, a pairing acknowledgement message based on the pairing request message. For example, 1704*h* may be performed by the machine learning service component 1940 in FIG. 19. Referring to FIG. 13A, at 1312, the second UE 1304 may receive, from the first UE 1302, a pairing acknowledgement message based on the pairing request message 1310.

In one configuration, at 1706, the second UE may transmit, to a network node, an inference result indicative of an upcoming blockage associated with a beam or a beam steering direction used for communication between the network node and the first UE. The inference result may be generated based on one or more machine learning inference models. At least one machine learning inference model component in the one or more machine learning inference models may be associated with the beam or the beam steering direction. For example, 1706 may be performed by the machine learning service component 1940 in FIG. 19. Referring to FIGS. 12A, 12B, 13A, 13B, at 1218, 1268, 1316, and 1366, the second UE 1204/1254/1304/1354 may transmit, to a network node 1206/1256/1306/1356, an inference result indicative of an upcoming blockage associated with a beam or a beam steering direction used for communication between the network node 1206/1256/1306/1356 and the first UE 1202/1252/1302/1352.

Figure 18:
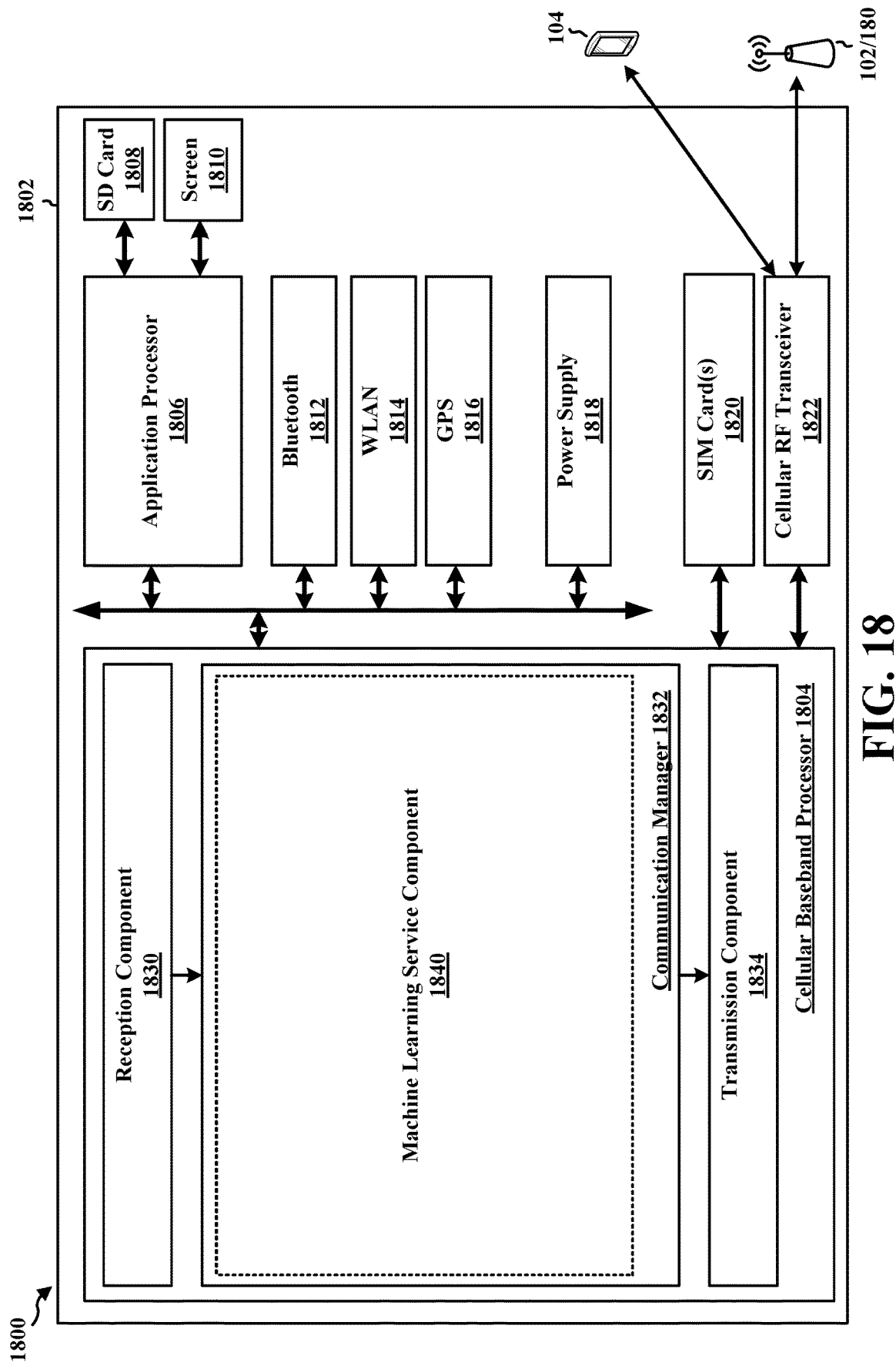
FIG. 18 is a diagram illustrating an example of a hardware implementation for an example apparatus.

FIG. 18 is a diagram 1800 illustrating an example of a hardware implementation for an apparatus 1802. The apparatus 1802 may be a first UE, a component of a first UE, or may implement first UE functionality. In some aspects, the apparatus 1802 may include a cellular baseband processor 1804 (also referred to as a modem) coupled to a cellular RF transceiver 1822. In some aspects, the apparatus 1802 may further include one or more subscriber identity modules (SIM) cards 1820, an application processor 1806 coupled to a secure digital (SD) card 1808 and a screen 1810, a Bluetooth module 1812, a wireless local area network (WLAN) module 1814, a Global Positioning System (GPS) module 1816, or a power supply 1818. The cellular baseband processor 1804 communicates through the cellular RF transceiver 1822 with the UE 104 and/or BS 102/180. The cellular baseband processor 1804 may include a computer-readable medium/memory. The computer-readable medium/memory may be non-transitory. The cellular baseband processor 1804 is responsible for general processing, including the execution of software stored on the computer-readable medium/memory. The software, when executed by the cellular baseband processor 1804, causes the cellular baseband processor 1804 to perform the various functions described supra. The computer-readable medium/memory may also be used for storing data that is manipulated by the cellular baseband processor 1804 when executing software. The cellular baseband processor 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the cellular baseband processor 1804. The cellular baseband processor 1804 may be a component of the UE 350 and may include the memory 360 and/or at least one of the TX processor 368, the RX processor 356, and the controller/processor 359. In one configuration, the apparatus 1802 may be a modem chip and include just the baseband processor 1804, and in another configuration, the apparatus 1802 may be the entire UE (e.g., see 350 of FIG. 3) and include the additional modules of the apparatus 1802.

The communication manager 1832 includes a machine learning service component 1840 that may be configured to exchange information relating to one or more machine learning services with a second UE, e.g., as described in connection with 1402 in FIGS. 14 and 1502 in FIG. 15. The machine learning service component 1840 may be configured to transmit, to the second UE, a service discovery request message indicating that the first UE is searching for a machine learning service provider, e.g., as described in connection with 1502a in FIG. 15. The machine learning service component 1840 may be configured to receive, from the second UE, a service discovery response message based on the service discovery request message, e.g., as described in connection with 1502b in FIG. 15. The machine learning service component 1840 may be configured to receive, from the second UE, a service discovery request message indicating that the second UE is searching for a machine learning service user, e.g., as described in connection with 1502c in FIG. 15. The machine learning service component 1840 may be configured to transmit, to the second UE, a service discovery response message based on the service discovery request message, e.g., as described in connection with 1502d in FIG. 15. The machine learning service component 1840 may be configured to transmit, to the second UE, a service announcement message indicating the one or more machine learning services, e.g., as described in connection with 1502e in FIG. 15. The machine learning service component 1840 may be configured to receive, from the second UE, a service announcement message indicating the one or more machine learning services, e.g., as described in connection with 1502f in FIG. 15. The machine learning service component 1840 may be configured to pair with the second UE for the one or more machine learning services, e.g., as described in connection with 1404 in FIGS. 14 and 1504 in FIG. 15. The machine learning service component 1840 may be configured to transmit, to the second UE, a pairing request message based on the received service discovery response message or a capability of the first UE, e.g., as described in connection with 1504a in FIG. 15. The machine learning service component 1840 may be configured to receive, from the second UE, a pairing acknowledgement message based on the pairing request message, e.g., as described in connection with 1504b in FIG. 15. The machine learning service component 1840 may be configured to receive, from the second UE, a pairing request message based on the transmitted service discovery response message or a capability of the second UE, e.g., as described in connection with 1504c in FIG. 15. The machine learning service component 1840 may be configured to transmit, to the second UE, a pairing acknowledgement message based on the pairing request message, e.g., as described in connection with 1504d in FIG. 15. The machine learning service component 1840 may be configured to transmit, to the second UE, a pairing acknowledgement message based on the pairing request message, e.g., as described in connection with 1504e in FIG. 15. The machine learning service component 1840 may be configured to transmit, to the second UE, a pairing acknowledgement message based on the pairing request message, e.g., as described in connection with 1504f in FIG. 15. The machine learning service component 1840 may be configured to transmit, to the second UE, a pairing request message based on at least one of the received service announcement message, a machine learning service user ID associated with the first UE, or a capability of the first UE, e.g., as described in connection with 1504g in FIG. 15. The machine learning service component 1840 may be configured to receive, from the second UE, a pairing acknowledgement message based on the pairing request message, e.g., as described in connection with 1504h in FIG. 15. The machine learning service component 1840 may be configured to receive, from a network node, an indication to switch to a different beam for communicating with the network node based at least in part on one or more machine learning inference models, e.g., as described in connection with 1506 in FIG. 15.

The apparatus may include additional components that perform each of the blocks of the algorithm in the flowcharts of FIGS. 12A, 12B, 13A, 13B, 14, and 15. As such, each block in the flowcharts of FIGS. 12A, 12B, 13A, 13B, 14, and 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1802 may include a variety of components configured for various functions. In one configuration, the apparatus 1802, and in particular the cellular baseband processor 1804, includes means for exchanging information relating to one or more machine learning services with a second UE. The one or more machine learning services may be provided by the second UE. The apparatus 1802, and in particular the cellular baseband processor 1804, includes means for pairing with the second UE for the one or more machine learning services.

In one configuration, to exchange the information relating to the one or more machine learning services with the second UE, the apparatus 1802, and in particular the cellular baseband processor 1804, includes means for transmitting, to the second UE, a service discovery request message indicating that the first UE is searching for a machine learning service provider. The apparatus 1802, and in particular the cellular baseband processor 1804, includes means for receiving, from the second UE, a service discovery response message based on the service discovery request message. In one configuration, the service discovery request message may indicate at least one of a machine learning service user ID associated with the first UE or that the first UE is a user of the one or more machine learning services. In one configuration, the service discovery response message may indicate at least one of a machine learning service provider status associated with the second UE, a machine learning service provider ID associated with the second UE, information about the one or more machine learning services provided by the second UE, a machine learning application ID, a machine learning service ID, an indication of a machine learning service type, or an indication of one or more machine learning service parameters. The machine learning service type may correspond to at least one of sensor data collection, feature extraction, or inference. The one or more machine learning service parameters may correspond to at least one of a data input format, a machine learning feature extraction model supported by the second UE, or a machine learning inference model supported by the second UE. In one configuration, to pair with the second UE for the one or more machine learning services, the apparatus 1802, and in particular the cellular baseband processor 1804, includes means for transmitting, to the second UE, a pairing request message based on the received service discovery response message or a capability of the first UE. The pairing request message may include at least one of a machine learning application ID, a machine learning service ID, a machine learning service provider ID associated with the second UE, an indication of a machine learning service type, an indication of a machine learning feature extraction model supported by the second UE, an indication of a machine learning inference model supported by the second UE, or a machine learning service user ID associated with the first UE. The apparatus 1802, and in particular the cellular baseband processor 1804, includes means for receiving, from the second UE, a pairing acknowledgement message based on the pairing request message. In one configuration, to exchange the information relating to the one or more machine learning services with the second UE, the apparatus 1802, and in particular the cellular baseband processor 1804, includes means for receiving, from the second UE, a service discovery request message indicating that the second UE is searching for a machine learning service user. The apparatus 1802, and in particular the cellular baseband processor 1804, includes means for transmitting, to the second UE, a service discovery response message based on the service discovery request message. In one configuration, the service discovery request message may indicate at least one of a machine learning service provider ID associated with the second UE or that the second UE is a provider of the one or more machine learning services. In one configuration, the service discovery response message may indicate at least one of a machine learning service user status associated with the first UE, a machine learning service user ID associated with the first UE, a machine learning application identifier ID, a machine learning service ID, an indication of a machine learning service type, or an indication of one or more machine learning service parameters. The machine learning service type may correspond to at least one of sensor data collection, feature extraction, or inference. The one or more machine learning service parameters may correspond to at least one of a data input format, a machine learning feature extraction mode supported by the second UE, or a machine learning inference model supported by the second UE. In one configuration, to pair with the second UE for the one or more machine learning services, the apparatus 1802, and in particular the cellular baseband processor 1804, includes means for receiving, from the second UE, a pairing request message based on the transmitted service discovery response message or a capability of the second UE. The pairing request message may include at least one of a machine learning application ID, a machine learning service ID, a machine learning service user ID associated with the first UE, an indication of a machine learning service type, an indication of a machine learning feature extraction model supported by the second UE, an indication of a machine learning inference model supported by the second UE, or a machine learning service provider ID associated with the second UE. The apparatus 1802, and in particular the cellular baseband processor 1804, includes means for transmitting, to the second UE, a pairing acknowledgement message based on the pairing request message. In one configuration, to exchange the information relating to the one or more machine learning services with the second UE, the apparatus 1802, and in particular the cellular baseband processor 1804, includes means for transmitting, to the second UE, a service discovery announcement message indicating that the first UE is searching for the one or more machine learning services. The service discovery announcement message may include at least one of a machine learning application ID, a machine learning service ID, a machine learning service user ID associated with the first UE, an indication of a machine learning service type, or an indication of one or more machine learning service parameters. The machine learning service type may correspond to at least one of sensor data collection, feature extraction, or inference. The one or more machine learning service parameters may correspond to at least one of a data input format, a machine learning feature extraction model supported by the second UE, or a machine learning inference model supported by the second UE. In one configuration, to pair with the second UE for the one or more machine learning services, the apparatus 1802, and in particular the cellular baseband processor 1804, includes means for receiving, from the second UE, a pairing request message based on at least one of the transmitted service discovery announcement message, a machine learning service provider ID associated with the second UE, or a capability of the second UE. The apparatus 1802, and in particular the cellular baseband processor 1804, includes means for transmitting, to the second UE, a pairing acknowledgement message based on the pairing request message. In one configuration, to exchange the information relating to the one or more machine learning services with the second UE, the apparatus 1802, and in particular the cellular baseband processor 1804, includes means for receiving, from the second UE, a service announcement message indicating the one or more machine learning services. The service announcement message may include at least one of a machine learning application ID, a machine learning service ID, a machine learning service provider ID associated with the second UE, an indication of a machine learning service type, or an indication of one or more machine learning service parameters. The machine learning service type may correspond to at least one of sensor data collection, feature extraction, or inference. The one or more machine learning service parameters may correspond to at least one of a data input format, a machine learning feature extraction model supported by the second UE, or a machine learning inference model supported by the second UE. In one configuration, to pair with the second UE for the one or more machine learning service, the apparatus 1802, and in particular the cellular baseband processor 1804, includes means for transmitting, to the second UE, a pairing request message based on at least one of the received service announcement message, a machine learning service user ID associated with the first UE, or a capability of the first UE. The apparatus 1802, and in particular the cellular baseband processor 1804, includes means for receiving, from the second UE, a pairing acknowledgement message based on the pairing request message. In one configuration, the apparatus 1802, and in particular the cellular baseband processor 1804, includes means for receiving, from a network node, an indication to switch to a different beam for communicating with the network node based at least in part on one or more machine learning inference models.

The means may be one or more of the components of the apparatus 1802 configured to perform the functions recited by the means. As described supra, the apparatus 1802 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 19:
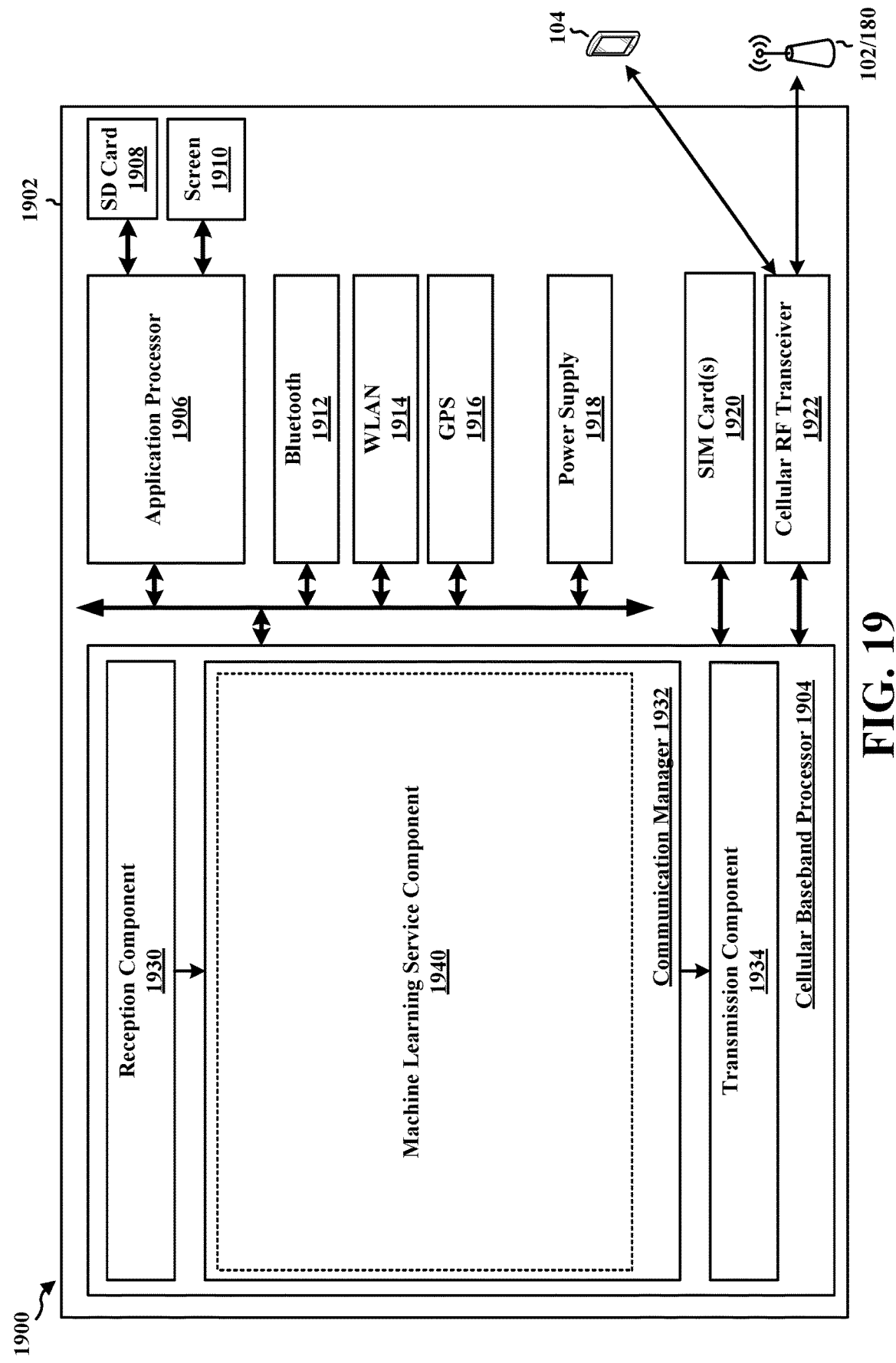
FIG. 19 is a diagram illustrating an example of a hardware implementation for an example apparatus.

FIG. 19 is a diagram 1900 illustrating an example of a hardware implementation for an apparatus 1902. The apparatus 1902 may be a second UE, a component of a second UE, or may implement second UE functionality. In some aspects, the apparatus 1902 may include a cellular baseband processor 1904 (also referred to as a modem) coupled to a cellular RF transceiver 1922. In some aspects, the apparatus 1902 may further include one or more subscriber identity modules (SIM) cards 1920, an application processor 1906 coupled to a secure digital (SD) card 1908 and a screen 1910, a Bluetooth module 1912, a wireless local area network (WLAN) module 1914, a Global Positioning System (GPS) module 1916, or a power supply 1918. The cellular baseband processor 1904 communicates through the cellular RF transceiver 1922 with the UE 104 and/or BS 102/180. The cellular baseband processor 1904 may include a computer-readable medium/memory. The computer-readable medium/memory may be non-transitory. The cellular baseband processor 1904 is responsible for general processing, including the execution of software stored on the computer-readable medium/memory. The software, when executed by the cellular baseband processor 1904, causes the cellular baseband processor 1904 to perform the various functions described supra. The computer-readable medium/memory may also be used for storing data that is manipulated by the cellular baseband processor 1904 when executing software. The cellular baseband processor 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the cellular baseband processor 1904. The cellular baseband processor 1904 may be a component of the UE 350 and may include the memory 360 and/or at least one of the TX processor 368, the RX processor 356, and the controller/processor 359. In one configuration, the apparatus 1902 may be a modem chip and include just the baseband processor 1904, and in another configuration, the apparatus 1902 may be the entire UE (e.g., see 350 of FIG. 3) and include the additional modules of the apparatus 1902.

The communication manager 1932 includes a machine learning service component 1940 that may be configured to exchange information relating to one or more machine learning services with a first UE, e.g., as described in connection with 1602 in FIGS. 16 and 1702 in FIG. 17. The machine learning service component 1940 may be configured to transmit, to the first UE, a service discovery request message indicating that the second UE is searching for a machine learning service user, e.g., as described in connection with 1702a in FIG. 17. The machine learning service component 1940 may be configured to receive, from the first UE, a service discovery response message based on the service discovery request message, e.g., as described in connection with 1702b in FIG. 17. The machine learning service component 1940 may be configured to receive, from the first UE, a service discovery request message indicating that the first UE is searching for a machine learning service provider, e.g., as described in connection with 1702c in FIG. 17. The machine learning service component 1940 may be configured to transmit, to the first UE, a service discovery response message based on the service discovery request message, e.g., as described in connection with 1702d in FIG. 17. The machine learning service component 1940 may be configured to transmit, to the first UE, a service announcement message indicating the one or more machine learning services, e.g., as described in connection with 1702e in FIG. 17. The machine learning service component 1940 may be configured to receive, from the first UE, a service announcement message indicating the one or more machine learning services, e.g., as described in connection with 1702f in FIG. 17. The machine learning service component 1940 may be configured to pair with the first UE for the one or more machine learning services, e.g., as described in connection with 1604 in FIGS. 16 and 1704 in FIG. 17. The machine learning service component 1940 may be configured to transmit, to the first UE, a pairing request message based on the received service discovery response message or a capability of the second UE, e.g., as described in connection with 1704a in FIG. 17. The machine learning service component 1940 may be configured to receive, from the first UE, a pairing acknowledgement message based on the pairing request message, e.g., as described in connection with 1704b in FIG. 17. The machine learning service component 1940 may be configured to receive, from the first UE, a pairing request message based on the transmitted service discovery response message or a capability of the first UE, e.g., as described in connection with 1704c in FIG. 17. The machine learning service component 1940 may be configured to transmit, to the first UE, a pairing acknowledgement message based on the pairing request message, e.g., as described in connection with 1704d in FIG. 17. The machine learning service component 1940 may be configured to receive, from the first UE, a pairing request message based on at least one of the transmitted service announcement message, a machine learning service user ID associated with the first UE, or a capability of the first UE, e.g., as described in connection with 1704e in FIG. 17. The machine learning service component 1940 may be configured to transmit, to the first UE, a pairing acknowledgement message based on the pairing request message, e.g., as described in connection with 1704f in FIG. 17. The machine learning service component 1940 may be configured to transmit, to the first UE, a pairing request message based on at least one of the received service announcement message, a machine learning service provider ID associated with the second UE, or a capability of the second UE, e.g., as described in connection with 1704g in FIG. 17. The machine learning service component 1940 may be configured to receive, from the first UE, a pairing acknowledgement message based on the pairing request message, e.g., as described in connection with 1704h in FIG. 17. The machine learning service component 1940 may be configured to transmit, to a network node, an inference result indicative of an upcoming blockage associated with a beam or a beam steering direction used for communication between the network node and the first UE, e.g., as described in connection with 1706 in FIG. 17.

The apparatus may include additional components that perform each of the blocks of the algorithm in the flowcharts of FIGS. 12A, 12B, 13A, 13B, 16, and 17. As such, each block in the flowcharts of FIGS. 12A, 12B, 13A, 13B, 16, and 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1902 may include a variety of components configured for various functions. In one configuration, the apparatus 1902, and in particular the cellular baseband processor 1904, includes means for exchanging information relating to one or more machine learning services with a first UE. The one or more machine learning services may be provided by the second UE. The apparatus 1902, and in particular the cellular baseband processor 1904, includes means for pairing with the first UE for the one or more machine learning services.

In one configuration, to exchange the information relating to the one or more machine learning services with the first UE, the apparatus 1902, and in particular the cellular baseband processor 1904, includes means for transmitting, to the first UE, a service discovery request message indicating the one or more machine learning services. The apparatus 1902, and in particular the cellular baseband processor 1904, includes means for receiving, from the first UE, a service discovery response message based on the service discovery request message. In one configuration, the service discovery request message may indicate at least a machine learning service provider ID associated with the second UE or that the second UE is a provider of the one or more machine learning services. In one configuration, the service discovery response message may include at least one of a machine learning application ID, a machine learning service ID, a machine learning service user ID associated with the first UE, an indication of a machine learning service type, or an indication of one or more machine learning service parameters. The machine learning service type may correspond to at least one of sensor data collection, feature extraction, or inference. The one or more machine learning service parameters may correspond to at least one of a data input format, a machine learning feature extraction model supported by the second UE, or a machine learning inference model supported by the second UE. In one configuration, to pair with the first UE for the one or more machine learning services, the apparatus 1902, and in particular the cellular baseband processor 1904, includes means for transmitting, to the first UE, a pairing request message based on the received service discovery response message or a capability of the second UE. The pairing request message may include at least one of a machine learning application ID, a machine learning service ID, a machine learning service user ID associated with the first UE, an indication of a machine learning service type, or an indication of one or more supported machine learning inference models. The apparatus 1902, and in particular the cellular baseband processor 1904, includes means for receiving, from the first UE, a pairing acknowledgement message based on the pairing request message. In one configuration, to exchange the information relating to the one or more machine learning services with the first UE, the apparatus 1902, and in particular the cellular baseband processor 1904, includes means for receiving, from the first UE, a service discovery request message indicating that the first UE is searching for a machine learning service provider. The apparatus 1902, and in particular the cellular baseband processor 1904, includes means for transmitting, to the first UE, a service discovery response message based on the service discovery request message. In one configuration, the service discovery request message may indicate at least one of a machine learning service user ID associated with the first UE or that the first UE is a user of the one or more machine learning services. In one configuration, the service discovery response message may include at least one of a machine learning application ID, a machine learning service ID, a machine learning service provider ID associated with the second UE, an indication of a machine learning service type, or an indication of one or more machine learning service parameters. The machine learning service type may correspond to at least one of sensor data collection, feature extraction, or inference. The one or more machine learning service parameters may correspond to at least one of a data input format, a machine learning feature extraction model supported by the second UE, or a machine learning inference model supported by the second UE. In one configuration, to pair with the first UE for the one or more machine learning services, the apparatus 1902, and in particular the cellular baseband processor 1904, includes means for receiving, from the first UE, a pairing request message based on the transmitted service discovery response message or a capability of the first UE. The pairing request message may include at least one of a machine learning application ID, a machine learning service ID, a machine learning service provider ID associated with the second UE, an indication of a machine learning service type, or an indication of one or more supported machine learning inference models. The apparatus 1902, and in particular the cellular baseband processor 1904, includes means for transmitting, to the first UE, a pairing acknowledgement message based on the pairing request message. In one configuration, to exchange the information relating to the one or more machine learning services with the first UE, the apparatus 1902, and in particular the cellular baseband processor 1904, includes means for transmitting, to the first UE, a service announcement message indicating the one or more machine learning services. The service announcement message may include at least one of a machine learning application ID, a machine learning service ID, a machine learning service provider ID associated with the second UE, or an indication of a machine learning service type, or an indication of one or more machine learning service parameters, wherein the machine learning service type corresponds to at least one of sensor data collection, feature extraction, or inference, and the one or more machine learning service parameters correspond to at least one of a data input format, a machine learning feature extraction model supported by the second UE, or a machine learning inference model supported by the second UE. In one configuration, to pair with the first UE for the one or more machine learning services, the apparatus 1902, and in particular the cellular baseband processor 1904, includes means for receiving, from the first UE, a pairing request message based on at least one of the transmitted service announcement message, a machine learning service user ID associated with the first UE, or a capability of the first UE. The apparatus 1902, and in particular the cellular baseband processor 1904, includes means for transmitting, to the first UE, a pairing acknowledgement message based on the pairing request message. In one configuration, to exchange the information relating to the one or more machine learning services with the first UE, the apparatus 1902, and in particular the cellular baseband processor 1904, includes means for receiving, from the first UE, a service discovery announcement message indicating the one or more machine learning services. The service discovery announcement message may include at least one of a machine learning application ID, a machine learning service ID, a machine learning service user ID associated with the first UE, an indication of a machine learning service type, or an indication of one or more machine learning service parameters. The machine learning service type may correspond to at least one of sensor data collection, feature extraction, or inference. The one or more machine learning service parameters may correspond to at least one of a data input format, a machine learning feature extraction model supported by the second UE, or a machine learning inference model supported by the second UE. In one configuration, to pair with the first UE for the one or more machine learning services, the apparatus 1902, and in particular the cellular baseband processor 1904, includes means for transmitting, to the first UE, a pairing request message based on at least one of the received service discovery announcement message, a machine learning service provider ID associated with the second UE, or a capability of the second UE. The apparatus 1902, and in particular the cellular baseband processor 1904, includes means for receiving, from the first UE, a pairing acknowledgement message based on the pairing request message. In one configuration, the apparatus 1902, and in particular the cellular baseband processor 1904, includes means for transmitting, to a network node, an inference result indicative of an upcoming blockage associated with a beam or a beam steering direction used for communication between the network node and the first UE. The inference result may be generated based on one or more machine learning inference models. At least one machine learning inference model component in the one or more machine learning inference models may be associated with the beam or the beam steering direction.

The means may be one or more of the components of the apparatus 1902 configured to perform the functions recited by the means. As described supra, the apparatus 1902 may include the TX Processor 368, the RX Processor 356, and the controller/processor 359. As such, in one configuration, the means may be the TX Processor 368, the RX Processor 356, and the controller/processor 359 configured to perform the functions recited by the means.

Referring back to FIGS. 4-19, a first UE and a second UE may exchange information relating to one or more machine learning services. The one or more machine learning services may be provided by the second UE. The first UE and the second UE may pair with each other for the one or more machine learning services. Accordingly, the second UE may perform machine learning inference using at least one machine learning inference model, and may transmit the inference result (e.g., the link quality prediction) associated with a link between a network node and the first UE to the network node. The network node may switch (the direction of) the network node beam if the inference result predicts that the degree of link quality degradation associated with a current network node beam is going to be greater than a prespecified threshold. Therefore, beam management for the communication between the network node and the first UE may be enhanced based on the machine learning techniques.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a first UE including at least one processor coupled to a memory and configured to exchange information relating to one or more machine learning services with a second UE, the one or more machine learning services being provided by the second UE; and pair with the second UE for the one or more machine learning services.

Aspect 2 is the apparatus of aspect 1, where to exchange the information relating to the one or more machine learning services with the second UE, the at least one processor is further configured to: transmit, to the second UE, a service discovery request message indicating that the first UE is searching for a machine learning service provider; and receive, from the second UE, a service discovery response message based on the service discovery request message.

Aspect 3 is the apparatus of aspect 2, where the service discovery request message indicates at least one of a machine learning service user ID associated with the first UE or that the first UE is a user of the one or more machine learning services.

Aspect 4 is the apparatus of any of aspects 2 and 3, where the service discovery response message indicates at least one of a machine learning service provider status associated with the second UE, a machine learning service provider ID associated with the second UE, or information about the one or more machine learning services provided by the second UE, a machine learning application ID, a machine learning service ID, an indication of a machine learning service type, or an indication of one or more machine learning service parameters, the machine learning service type corresponds to at least one of sensor data collection, feature extraction, or inference, and the one or more machine learning service parameters correspond to at least one of a data input format, a machine learning feature extraction model supported by the second UE, or a machine learning inference model supported by the second UE.

Aspect 5 is the apparatus of any of aspects 2 to 4, where to pair with the second UE for the one or more machine learning services, the at least one processor is further configured to: transmit, to the second UE, a pairing request message based on the received service discovery response message or a capability of the first UE, the pairing request message including at least one of a machine learning application ID, a machine learning service ID, a machine learning service provider ID associated with the second UE, an indication of a machine learning service type, an indication of a machine learning feature extraction model supported by the second UE, an indication of a machine learning inference model supported by the second UE, or a machine learning service user ID associated with the first UE; and receive, from the second UE, a pairing acknowledgement message based on the pairing request message.

Aspect 6 is the apparatus of aspect 1, where to exchange the information relating to the one or more machine learning services with the second UE, the at least one processor is further configured to: receive, from the second UE, a service discovery request message indicating that the second UE is searching for a machine learning service user; and transmit, to the second UE, a service discovery response message based on the service discovery request message.

Aspect 7 is the apparatus of aspect 6, where the service discovery request message indicates at least one of a machine learning service provider ID associated with the second UE or that the second UE is a provider of the one or more machine learning services.

Aspect 8 is the apparatus of any of aspects 6 and 7, where the service discovery response message indicates at least one of a machine learning service user status associated with the first UE, a machine learning service user ID associated with the first UE, a machine learning application identifier ID, a machine learning service ID, an indication of a machine learning service type, or an indication of one or more machine learning service parameters, the machine learning service type corresponds to at least one of sensor data collection, feature extraction, or inference, and the one or more machine learning service parameters correspond to at least one of a data input format, a machine learning feature extraction mode supported by the second UE, or a machine learning inference model supported by the second UE.

Aspect 9 is the apparatus of any of aspects 6 to 8, where to pair with the second UE for the one or more machine learning services, the at least one processor is further configured to: receive, from the second UE, a pairing request message based on the transmitted service discovery response message or a capability of the second UE, the pairing request message including at least one of a machine learning application ID, a machine learning service ID, a machine learning service user ID associated with the first UE, an indication of a machine learning service type, an indication of a machine learning feature extraction model supported by the second UE, an indication of a machine learning inference model supported by the second UE, or a machine learning service provider ID associated with the second UE; and transmit, to the second UE, a pairing acknowledgement message based on the pairing request message.

Aspect 10 is the apparatus of aspect 1, where to exchange the information relating to the one or more machine learning services with the second UE, the at least one processor is further configured to: transmit, to the second UE, a service discovery announcement message indicating that the first UE is searching for the one or more machine learning services, the service discovery announcement message including at least one of a machine learning application ID, a machine learning service ID, a machine learning service user ID associated with the first UE, an indication of a machine learning service type, or an indication of one or more machine learning service parameters, where the machine learning service type corresponds to at least one of sensor data collection, feature extraction, or inference, and the one or more machine learning service parameters correspond to at least one of a data input format, a machine learning feature extraction model supported by the second UE, or a machine learning inference model supported by the second UE.

Aspect 11 is the apparatus of aspect 10, where to pair with the second UE for the one or more machine learning services, the at least one processor is further configured to: receive, from the second UE, a pairing request message based on at least one of the transmitted service announcement message, a machine learning service provider ID associated with the second UE, or a capability of the second UE; and transmit, to the second UE, a pairing acknowledgement message based on the pairing request message.

Aspect 12 is the apparatus of aspect 1, where to exchange the information relating to the one or more machine learning services with the second UE, the at least one processor is further configured to: receive, from the second UE, a service announcement message indicating the one or more machine learning services, the service announcement message including at least one of a machine learning application ID, a machine learning service ID, a machine learning service provider ID associated with the second UE, an indication of a machine learning service type, or an indication of one or more machine learning service parameters, wherein the machine learning service type corresponds to at least one of sensor data collection, feature extraction, or inference, and the one or more machine learning service parameters correspond to at least one of a data input format, a machine learning feature extraction model supported by the second UE, or a machine learning inference model supported by the second UE.

Aspect 13 is the apparatus of aspect 12, where to pair with the second UE for the one or more machine learning service, the at least one processor is further configured to: transmit, to the second UE, a pairing request message based on at least one of the received service announcement message, a machine learning service user ID associated with the first UE, or a capability of the first UE; and receive, from the second UE, a pairing acknowledgement message based on the pairing request message.

Aspect 14 is the apparatus of any of aspects 1 to 13, the at least one processor being further configured to: receive, from a network node, an indication to switch to a different beam for communicating with the network node based at least in part on one or more machine learning inference models.

Aspect 15 is the apparatus of any of aspects 1 to 14, further including a transceiver coupled to the at least one processor.

Aspect 16 is an apparatus for wireless communication at a second UE including at least one processor coupled to a memory and configured to exchange information relating to one or more machine learning services with a first UE, the one or more machine learning services being provided by the second UE; and pair with the first UE for the one or more machine learning services.

Aspect 17 is the apparatus of aspect 16, where to exchange the information relating to the one or more machine learning services with the first UE, the at least one processor is further configured to: transmit, to the first UE, a service discovery request message indicating that the second UE is searching for a machine learning service user; and receive, from the first UE, a service discovery response message based on the service discovery request message.

Aspect 18 is the apparatus of aspect 17, where the service discovery request message indicates at least a machine learning service provider ID associated with the second UE or that the second UE is a provider of the one or more machine learning services.

Aspect 19 is the apparatus of any of aspects 17 and 18, where the service discovery response message includes at least one of a machine learning application ID, a machine learning service ID, a machine learning service user ID associated with the first UE, an indication of a machine learning service type, or an indication of one or more machine learning service parameters, the machine learning service type corresponds to at least one of sensor data collection, feature extraction, or inference, and the one or more machine learning service parameters correspond to at least one of a data input format, a machine learning feature extraction model supported by the second UE, or a machine learning inference model supported by the second UE.

Aspect 20 is the apparatus of any of aspects 17 to 19, where to pair with the first UE for the one or more machine learning services, the at least one processor is further configured to: transmit, to the first UE, a pairing request message based on the received service discovery response message or a capability of the second UE, the pairing request message including at least one of a machine learning application ID, a machine learning service ID, a machine learning service user ID associated with the first UE, an indication of a machine learning service type, or an indication of one or more supported machine learning inference models; and receive, from the first UE, a pairing acknowledgement message based on the pairing request message.

Aspect 21 is the apparatus of aspect 16, where to exchange the information relating to the one or more machine learning services with the first UE, the at least one processor is further configured to: receive, from the first UE, a service discovery request message indicating that the first UE is searching for a machine learning service provider; and transmit, to the first UE, a service discovery response message based on the service discovery request message.

Aspect 22 is the apparatus of aspect 21, where the service discovery request message indicates at least one of a machine learning service user ID associated with the first UE or that the first UE is a user of the one or more machine learning services.

Aspect 23 is the apparatus of any of aspects 21 and 22, where the service discovery response message includes at least one of a machine learning application ID, a machine learning service ID, a machine learning service provider ID associated with the second UE, an indication of a machine learning service type, or an indication of one or more machine learning service parameters, the machine learning service type corresponds to at least one of sensor data collection, feature extraction, or inference, and the one or more machine learning service parameters correspond to at least one of a data input format, a machine learning feature extraction model supported by the second UE, or a machine learning inference model supported by the second UE.

Aspect 24 is the apparatus of any of aspects 21 to 23, where to pair with the first UE for the one or more machine learning services, the at least one processor is further configured to: receive, from the first UE, a pairing request message based on the transmitted service discovery response message or a capability of the first UE, the pairing request message including at least one of a machine learning application ID, a machine learning service ID, a machine learning service provider ID associated with the second UE, an indication of a machine learning service type, or an indication of one or more supported machine learning inference models; and transmit, to the first UE, a pairing acknowledgement message based on the pairing request message.

Aspect 25 is the apparatus of aspect 16, where to exchange the information relating to the one or more machine learning services with the first UE, the at least one processor is further configured to: transmit, to the first UE, a service announcement message indicating the one or more machine learning services, the service announcement message including at least one of a machine learning application ID, a machine learning service ID, a machine learning service provider ID associated with the second UE, an indication of a machine learning service type, or an indication of one or more machine learning service parameters, where the machine learning service type corresponds to at least one of sensor data collection, feature extraction, or inference, and the one or more machine learning service parameters correspond to at least one of a data input format, a machine learning feature extraction model supported by the second UE, or a machine learning inference model supported by the second UE.

Aspect 26 is the apparatus of aspect 25, where to pair with the first UE for the one or more machine learning services, the at least one processor is further configured to: receive, from the first UE, a pairing request message based on at least one of the transmitted service announcement message, a machine learning service user ID associated with the first UE, or a capability of the first UE; and transmit, to the first UE, a pairing acknowledgement message based on the pairing request message.

Aspect 27 is the apparatus of aspect 16, where to exchange the information relating to the one or more machine learning services with the first UE, the at least one processor is further configured to: receive, from the first UE, a service discovery announcement message indicating the one or more machine learning services, the service discovery announcement message including at least one of a machine learning application ID, a machine learning service ID, a machine learning service user ID associated with the first UE, an indication of a machine learning service type, or an indication of one or more machine learning service parameters, wherein the machine learning service type corresponds to at least one of sensor data collection, feature extraction, or inference, and the one or more machine learning service parameters correspond to at least one of a data input format, a machine learning feature extraction model supported by the second UE, or a machine learning inference model supported by the second UE.

Aspect 28 is the apparatus of aspect 27, where to pair with the first UE for the one or more machine learning services, the at least one processor is further configured to: transmit, to the first UE, a pairing request message based on at least one of the received service announcement message, a machine learning service provider ID associated with the second UE, or a capability of the second UE; and receive, from the first UE, a pairing acknowledgement message based on the pairing request message.

Aspect 29 is the apparatus of any of aspects 16 to 28, the at least one processor being further configured to: transmit, to a network node, an inference result indicative of an upcoming blockage associated with a beam or a beam steering direction used for communication between the network node and the first UE, where the inference result is generated based on one or more machine learning inference models, and at least one machine learning inference model component in the one or more machine learning inference models is associated with the beam or the beam steering direction.

Aspect 30 is the apparatus of any of aspects 16 to 29, further comprising a transceiver coupled to the at least one processor.

Aspect 31 is a method of wireless communication for implementing any of aspects 1 to 30.

Aspect 32 is an apparatus for wireless communication including means for implementing any of aspects 1 to 30.

Aspect 33 is a computer-readable medium storing computer executable code, where the code when executed by a processor causes the processor to implement any of aspects 1 to 30.

What is claimed is:

1. An apparatus for wireless communication at a first UE, comprising:
   memory; and
   at least one processor coupled to the memory and configured to:
   exchange information relating to one or more machine learning services with a second UE, the one or more machine learning services being provided by the second UE, wherein the information comprises at least one of a machine learning service provider status associated with the second UE, a machine learning service provider identifier (ID) associated with the second UE, a machine learning service user status associated with the first UE, a machine learning service user ID associated with the first UE, information about the one or more machine learning services provided by the second UE, a machine learning application ID, a machine learning service ID, an indication of a machine learning service type, or an indication of one or more machine learning service parameters, the machine learning service type corresponds to at least one of sensor data collection, feature extraction, or inference, and the one or more machine learning service parameters correspond to at least one of a data input format, a machine learning feature extraction model supported by the second UE, or a machine learning inference model supported by the second UE; and
   pair with the second UE for the one or more machine learning services.

2. The apparatus of claim 1, wherein to exchange the information relating to the one or more machine learning services with the second UE, the at least one processor is further configured to:
   transmit, to the second UE, a service discovery request message indicating that the first UE is searching for a machine learning service provider; and
   receive, from the second UE, a service discovery response message based on the service discovery request message.

3. The apparatus of claim 2, wherein the service discovery request message indicates at least one of a machine learning service user ID associated with the first UE or that the first UE is a user of the one or more machine learning services.

4. The apparatus of claim 2, wherein the service discovery response message indicates at least one of the machine learning service provider status associated with the second UE, the machine learning service provider ID associated with the second UE, the information about the one or more machine learning services provided by the second UE, the machine learning application ID, the machine learning service ID, the indication of the machine learning service type, or the indication of one or more machine learning service parameters, the machine learning service type corresponds to at least one of the sensor data collection, the feature extraction, or the inference, and the one or more machine learning service parameters correspond to at least one of the data input format, the machine learning feature extraction model supported by the second UE, or the machine learning inference model supported by the second UE.

5. The apparatus of claim 2, wherein to pair with the second UE for the one or more machine learning services, the at least one processor is further configured to:
transmit, to the second UE, a pairing request message based on the received service discovery response message or a capability of the first UE, the pairing request message including at least one of the machine learning application ID, the machine learning service ID, the machine learning service provider ID associated with the second UE, the indication of the machine learning service type, an indication of the machine learning feature extraction model supported by the second UE, an indication of the machine learning inference model supported by the second UE, or the machine learning service user ID associated with the first UE; and
receive, from the second UE, a pairing acknowledgement message based on the pairing request message.

6. The apparatus of claim 1, wherein to exchange the information relating to the one or more machine learning services with the second UE, the at least one processor is further configured to:
receive, from the second UE, a service discovery request message indicating that the second UE is searching for a machine learning service user; and
transmit, to the second UE, a service discovery response message based on the service discovery request message.

7. The apparatus of claim 6, wherein the service discovery request message indicates at least one of the machine learning service provider ID associated with the second UE or that the second UE is a provider of the one or more machine learning services.

8. The apparatus of claim 6, wherein the service discovery response message indicates at least one of the machine learning service user status associated with the first UE, the machine learning service user ID associated with the first UE, the machine learning application identifier ID, the machine learning service ID, the indication of the machine learning service type, or the indication of one or more machine learning service parameters, the machine learning service type corresponds to at least one of the sensor data collection, the feature extraction, or the inference, and the one or more machine learning service parameters correspond to at least one of the data input format, the machine learning feature extraction model supported by the second UE, or the machine learning inference model supported by the second UE.

9. The apparatus of claim 6, wherein to pair with the second UE for the one or more machine learning services, the at least one processor is further configured to:
receive, from the second UE, a pairing request message based on the transmitted service discovery response message or a capability of the second UE, the pairing request message including at least one of the machine learning application ID, the machine learning service ID, the machine learning service user ID associated with the first UE, the indication of the machine learning service type, an indication of the machine learning feature extraction model supported by the second UE, an indication of the machine learning inference model supported by the second UE, or the machine learning service user ID associated with the first UE; and
transmit, to the second UE, a pairing acknowledgement message based on the pairing request message.

10. The apparatus of claim 1, wherein to exchange the information relating to the one or more machine learning services with the second UE, the at least one processor is further configured to:
transmit, to the second UE, a service discovery announcement message indicating that the first UE is searching for the one or more machine learning services, the service discovery announcement message including at least one of the machine learning application ID, the machine learning service ID, the machine learning service user ID associated with the first UE, the indication of the machine learning service type, or the indication of one or more the machine learning service parameters, wherein the machine learning service type corresponds to at least one of the sensor data collection, the feature extraction, or inference, and the one or more machine learning service parameters correspond to at least one of the data input format, the machine learning feature extraction model supported by the second UE, or the machine learning inference model supported by the second UE.

11. The apparatus of claim 10, wherein to pair with the second UE for the one or more machine learning services, the at least one processor is further configured to:
receive, from the second UE, a pairing request message based on at least one of the transmitted service discovery announcement message, a machine learning service provider ID associated with the second UE, or a capability of the second UE; and
transmit, to the second UE, a pairing acknowledgement message based on the pairing request message.

12. The apparatus of claim 1, wherein to exchange the information relating to the one or more machine learning services with the second UE, the at least one processor is further configured to:
receive, from the second UE, a service announcement message indicating the one or more machine learning services, the service announcement message including at least one of the machine learning application ID, the machine learning service ID, the machine learning service provider ID associated with the second UE, an indication of the machine learning service type, or the indication of the one or more machine learning service parameters, wherein the machine learning service type corresponds to at least one of the sensor data collection, the feature extraction, or the inference, and the one or more machine learning service parameters correspond to at least one of the data input format, the machine learning feature extraction model supported by the second UE, or the machine learning inference model supported by the second UE.

13. The apparatus of claim 12, wherein to pair with the second UE for the one or more machine learning services, the at least one processor is further configured to:
transmit, to the second UE, a pairing request message based on at least one of the received service announcement message, a machine learning service user ID associated with the first UE, or a capability of the first UE; and
receive, from the second UE, a pairing acknowledgement message based on the pairing request message.

14. The apparatus of claim 1, further comprising a transceiver coupled to the at least one processor, the at least one processor being further configured to:

receive, from a network node, an indication to switch to a different beam for communicating with the network node based at least in part on one or more machine learning inference models.

15. A method of wireless communication at a first UE, comprising:
exchanging information relating to one or more machine learning services with a second UE, the one or more machine learning services being provided by the second UE, wherein the information comprises at least one of wherein the information comprises at least one of a machine learning service provider status associated with the second UE, a machine learning service provider identifier (ID) associated with the second UE, a machine learning service user status associated with the first UE, a machine learning service user ID associated with the first UE, information about the one or more machine learning services provided by the second UE, a machine learning application ID, a machine learning service ID, an indication of a machine learning service type, or an indication of one or more machine learning service parameters, the machine learning service type corresponds to at least one of sensor data collection, feature extraction, or inference, and the one or more machine learning service parameters correspond to at least one of a data input format, a machine learning feature extraction model supported by the second UE, or a machine learning inference model supported by the second UE; and
pairing with the second UE for the one or more machine learning services.

16. An apparatus for wireless communication at a second UE, comprising:
memory; and
at least one processor coupled to the memory and configured to:
exchange information relating to one or more machine learning services with a first UE, the one or more machine learning services being provided by the second UE, wherein the information comprises at least one of a machine learning service provider status associated with the second UE, a machine learning service provider identifier (ID) associated with the second UE, a machine learning service user status associated with the first UE, a machine learning service user ID associated with the first UE, information about the one or more machine learning services provided by the second UE, a machine learning application ID, a machine learning service ID, an indication of a machine learning service type, or an indication of one or more machine learning service parameters, the machine learning service type corresponds to at least one of sensor data collection, feature extraction, or inference, and the one or more machine learning service parameters correspond to at least one of a data input format, a machine learning feature extraction model supported by the second UE, or a machine learning inference model supported by the second UE; and
pair with the first UE for the one or more machine learning services.

17. The apparatus of claim 16, wherein to exchange the information relating to the one or more machine learning services with the first UE, the at least one processor is further configured to:

transmit, to the first UE, a service discovery request message indicating that the second UE is searching for a machine learning service user; and
receive, from the first UE, a service discovery response message based on the service discovery request message.

18. The apparatus of claim 17, wherein the service discovery request message indicates at least a machine learning service provider ID associated with the second UE or that the second UE is a provider of the one or more machine learning services.

19. The apparatus of claim 17, wherein the service discovery response message includes at least one of the machine learning application ID, the machine learning service ID, the machine learning service user ID associated with the first UE, the indication of the machine learning service type, or the indication of one or more machine learning service parameters, the machine learning service type corresponds to at least one of the sensor data collection, the feature extraction, or the inference, and the one or more machine learning service parameters correspond to at least one of the data input format, the machine learning feature extraction model supported by the second UE, or the machine learning inference model supported by the second UE.

20. The apparatus of claim 17, wherein to pair with the first UE for the one or more machine learning services, the at least one processor is further configured to:
transmit, to the first UE, a pairing request message based on the received service discovery response message or a capability of the second UE, the pairing request message including at least one of the machine learning application ID, the machine learning service ID, the machine learning service user ID associated with the first UE, the indication of the machine learning service type, or an indication of one or more supported machine learning inference models; and
receive, from the first UE, a pairing acknowledgement message based on the pairing request message.

21. The apparatus of claim 16, wherein to exchange the information relating to the one or more machine learning services with the first UE, the at least one processor is further configured to:
receive, from the first UE, a service discovery request message indicating that the first UE is searching for a machine learning service provider; and
transmit, to the first UE, a service discovery response message based on the service discovery request message.

22. The apparatus of claim 21, wherein the service discovery request message indicates at least one of a machine learning service user ID associated with the first UE or that the first UE is a user of the one or more machine learning services.

23. The apparatus of claim 21, wherein the service discovery response message includes at least one of the machine learning application ID, the machine learning service ID, the machine learning service provider ID associated with the second UE, the indication of the machine learning service type, or the indication of the one or more machine learning service parameters, the machine learning service type corresponds to at least one of the sensor data collection, the feature extraction, or the inference, and the one or more machine learning service parameters correspond to at least one of the data input format, the machine learning feature extraction model supported by the second UE, or the machine learning inference model supported by the second UE.

24. The apparatus of claim 21, wherein to pair with the first UE for the one or more machine learning services, the at least one processor is further configured to:
receive, from the first UE, a pairing request message based on the transmitted service discovery response message or a capability of the first UE, the pairing request message including at least one of a machine learning application ID, the machine learning service ID, the machine learning service provider ID associated with the second UE, the indication of the machine learning service type, or an indication of one or more supported machine learning inference models; and
transmit, to the first UE, a pairing acknowledgement message based on the pairing request message.

25. The apparatus of claim 16, wherein to exchange the information relating to the one or more machine learning services with the first UE, the at least one processor is further configured to:
transmit, to the first UE, a service announcement message indicating the one or more machine learning services, the service announcement message including at least one of the machine learning application ID, the machine learning service ID, the machine learning service provider ID associated with the second UE, the indication of the machine learning service type, or the indication of the one or more machine learning service parameters, wherein the machine learning service type corresponds to at least one of the sensor data collection, the feature extraction, or the inference, and the one or more machine learning service parameters correspond to at least one of the data input format, the machine learning feature extraction model supported by the second UE, or the machine learning inference model supported by the second UE.

26. The apparatus of claim 25, wherein to pair with the first UE for the one or more machine learning services, the at least one processor is further configured to:
receive, from the first UE, a pairing request message based on at least one of the transmitted service announcement message, a machine learning service user ID associated with the first UE, or a capability of the first UE; and
transmit, to the first UE, a pairing acknowledgement message based on the pairing request message.

27. The apparatus of claim 16, wherein to exchange the information relating to the one or more machine learning services with the first UE, the at least one processor is further configured to:
receive, from the first UE, a service discovery announcement message indicating the one or more machine learning services, the service discovery announcement message including at least one of the machine learning application ID, the machine learning service ID, the machine learning service user ID associated with the first UE, the indication of the machine learning service type, or the indication of the one or more machine learning service parameters, wherein the machine learning service type corresponds to at least one of the sensor data collection, the feature extraction, or the inference, and the one or more machine learning service parameters correspond to at least one of the data input format, the machine learning feature extraction model supported by the second UE, or the machine learning inference model supported by the second UE.

28. The apparatus of claim 27, wherein to pair with the first UE for the one or more machine learning services, the at least one processor is further configured to:
transmit, to the first UE, a pairing request message based on at least one of the received service discovery announcement message, a machine learning service provider ID associated with the second UE, or a capability of the second UE; and
receive, from the first UE, a pairing acknowledgement message based on the pairing request message.

29. The apparatus of claim 16, further comprising a transceiver coupled to the at least one processor, the at least one processor being further configured to:
transmit, to a network node, an inference result indicative of an upcoming blockage associated with a beam or a beam steering direction used for communication between the network node and the first UE, wherein the inference result is generated based on one or more machine learning inference models, and at least one machine learning inference model component in the one or more machine learning inference models is associated with the beam or the beam steering direction.

30. A method of wireless communication at a second UE, comprising:
exchanging information relating to one or more machine learning services with a first UE, the one or more machine learning services being provided by the second UE, wherein the information comprises at least one of a machine learning service provider status associated with the second UE, a machine learning service provider identifier (ID) associated with the second UE, a machine learning service user status associated with the first UE, a machine learning service user ID associated with the first UE, information about the one or more machine learning services provided by the second UE, a machine learning application ID, a machine learning service ID, an indication of a machine learning service type, or an indication of one or more machine learning service parameters, the machine learning service type corresponds to at least one of sensor data collection, feature extraction, or inference, and the one or more machine learning service parameters correspond to at least one of a data input format, a machine learning feature extraction model supported by the second UE, or a machine learning inference model supported by the second UE; and
pairing with the first UE for the one or more machine learning services.

* * * * *